US012475436B2

(12) United States Patent
Gupta et al.

(10) Patent No.: US 12,475,436 B2
(45) Date of Patent: Nov. 18, 2025

(54) INCLUSIVE PRODUCT DESIGN

(71) Applicant: ACCENTURE GLOBAL SOLUTIONS LIMITED, Dublin (IE)

(72) Inventors: Anshul U Gupta, Ghaziabad (IN); Meeta Lal Budhrani, Bangalore (IN); Akshay Tutika, Hyderabad (IN); Jyoti Bishnoi, Bangalore (IN); Yogesh Kanoi, Kolkata (IN); Vinivesh Raina, Jammu (IN); Suman Nelli, Rajanna Sirisilla (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 319 days.

(21) Appl. No.: 17/863,221

(22) Filed: Jul. 12, 2022

(65) Prior Publication Data

US 2024/0020644 A1    Jan. 18, 2024

(51) Int. Cl.
 *G06Q 20/00* (2012.01)
 *G06N 20/00* (2019.01)
 *G06Q 10/10* (2023.01)

(52) U.S. Cl.
 CPC .......... *G06Q 10/103* (2013.01); *G06N 20/00* (2019.01)

(58) Field of Classification Search
 None
 See application file for complete search history.

(56) References Cited

U.S. PATENT DOCUMENTS

2016/0314507 A1    10/2016  Tedjamulia et al.
2020/0349495 A1*   11/2020  Chougule ............. G06Q 50/01

OTHER PUBLICATIONS

F. Ferrise, G. P. Furtado, S. Graziosi and M. Bordegoni, "Digitalizing and capturing haptic feedback in virtual prototypes for User Experience design," 2013 18th International Conference on Digital Signal Processing (DSP), Fira, Greece, 2013, pp. 1-7, doi: 10.1109/ICDSP.2013.6622823 (Year: 2013).*

"Inclusive Design Toolkit", University of Cambridge, 2017, http://www.inclusivedesigntoolkit.com, (5 pages).

Gandhi et al. "Risk Management in Software Development using Artificial Neural Networks"International Journal of 1 Computer Applications (0975-8887) vol. 93—No. 19, May 2014.

* cited by examiner

*Primary Examiner* — Rashida R Shorter
(74) *Attorney, Agent, or Firm* — Mannava & Kang, P.C.

(57) ABSTRACT

Systems and methods for inclusive product design are disclosed. The system obtains likeness score for product attributes for product using survey before design phase of product, from user(s), and determines impact and relative contribution of each product attribute, for user, to inclusivity score, using multi-level machine learning models. The system segregates product attributes and inclusivity score at persona level, and determines feature importance score of each feature in product attributes for each user. System calculates risk score for each user indicating sensibility towards product designer choices, and provides what-if analysis capabilities to product designer for analyzing, based on risk score, risk of each user with sensibility towards product designer choices and receives multisensory review from user. The system computes overall score by combining feature importance and inclusivity scores, facial coding, voice tonality, and haptics feedback, to granular level and outputs iteratively enriched survey data for inclusive designing of products.

18 Claims, 20 Drawing Sheets

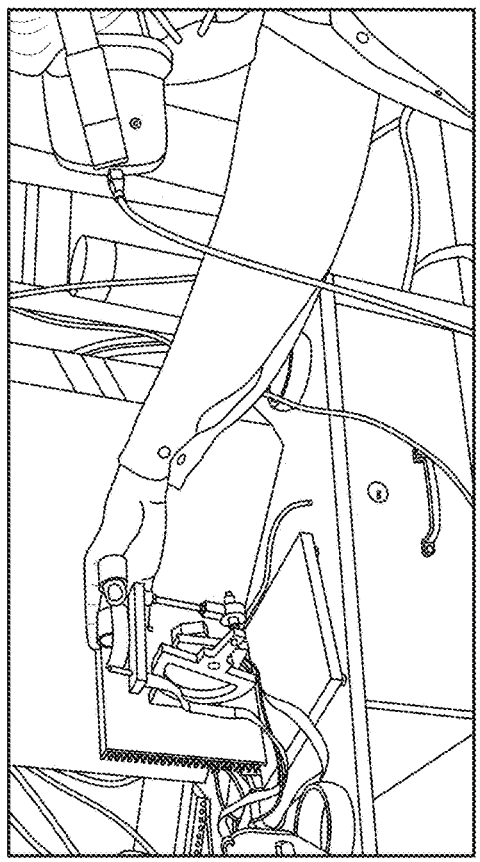
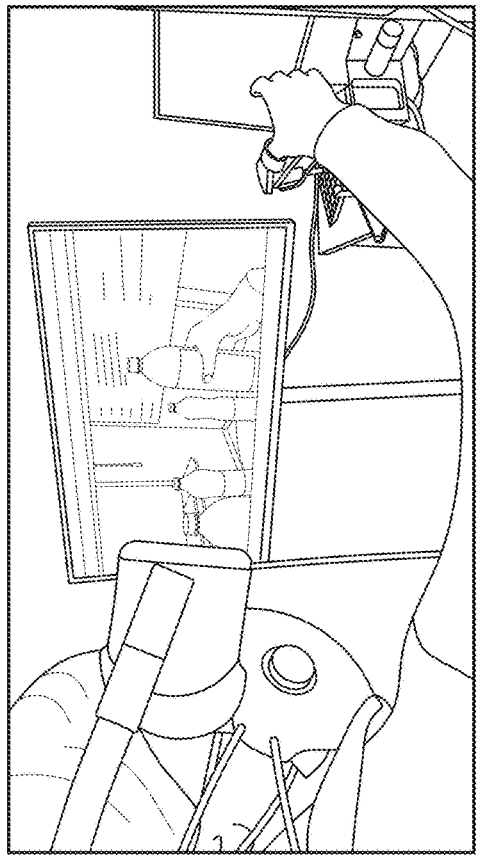
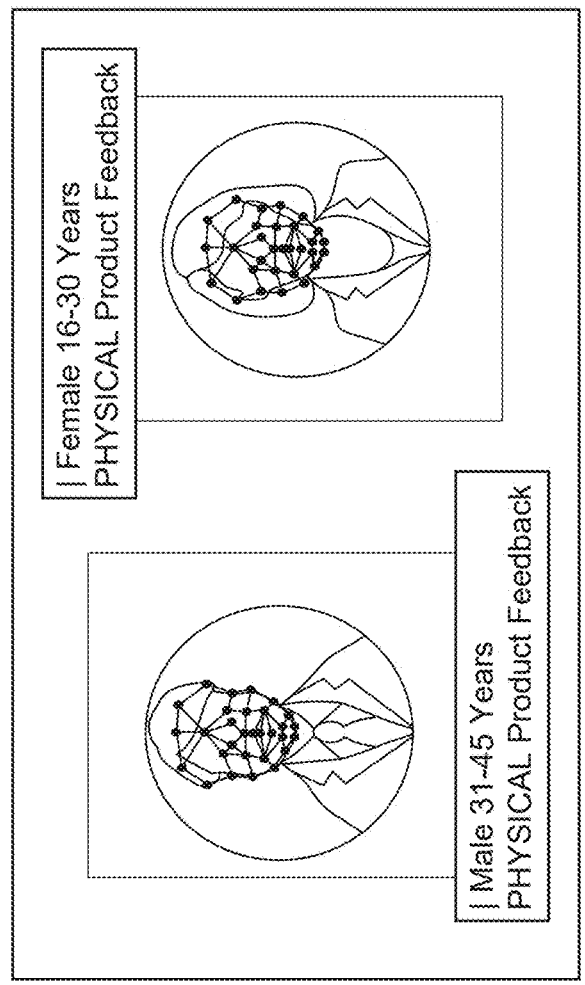
FIG. 3G

INCLUSIVE PRODUCT DESIGN

BACKGROUND

Generally, everyday products, technologies, and experiences, for example, car crash test dummies, mobile phones, seat belts, clinical trials, power tools, and the like, may be designed with a focus towards particular demography or a target population sample. This lack of inclusion may impact not only the comfort of using the product, but also the safety of the users of the product in certain scenarios. Further, the growing speed of product development (with shorter time to market, rapid addition of new product features, and transformation of many products due to technological change) makes the ability to measure and deal with complexity in product development considerably more difficult. The rate of product evolution in many product categories may have become faster than ever. The measurement methods for product development may need to evolve to keep pace with the speed and scope of business decision-making. However, it may still generally take a considerable amount of time to run different types of meaningful studies in areas such as impact of human factors, product testing, market research, and product field trials. Such labor-intensive studies, which are conducted by professionals, may be expensive.

In addition, many product design decisions may not wait or may not have a budget for testing/market research. This leads to manufacturing of products without the benefit of in-depth customer-based studies that would have made the product design decisions clearer, simpler, and more accurate. For example, a recently launched mobile phone may not be suitable for an individual due to larger size of the mobile phone than its predecessor. Further, in some examples, it may be difficult for another individual to hold the mobile phone, while holding on to kids with one hand, and carrying a bag or holding the mobile phone in the other. Therefore, an inconvenient form factor of the mobile phone may lead to decrease in sales of the newly launched mobile phones if the target population is largely represented by such individuals. To recapture the market and increase sales, the manufacturer or provider may quickly release another successor to the previously launched mobile phone, without appropriate trials. However, the exact reason for the unsuitability of the mobile phone may not be known/studied in detail.

In another example, if a user searches for a key-phrase "famous people" in a search engine, the results may not adequately represent different types of individuals that are famous in different fields. In yet another example, certain messaging applications may not provide different types of emojis relevant for different individuals from different demographist or age groups.

Considering the aforementioned examples, it is highly desirable that the product or service needs are prototyped and designed in such a manner that it suits preferences of different individuals, communities, age groups, and demographics of the target users. Due to poor product design without considering these aspects, there may be a decrease in sales of products or services irrespective of their innovation quotient.

Conventional test methods may only partly assist in making crucial product decisions. For example, conventional test methods may not determine, whether or not a product's target user learned the procedures for using the product, action, and behavioral information during the actual use of the product or the service. In most of the scenarios, the user of the product may prefer to interact with the products, rather than providing a feedback to the product manufacturer. The product manufacturer may expect to receive feedback from the user, when the user has a problem and/or has an unmet need. When the user directly provides feedback, the manufacturer may find an appropriate platform with a focus group, that helps in improving products, services, and business relationships.

However, the conventional methods may not enable product designers/vendors/manufacturers to learn directly from their customers on an ongoing basis and establish a private two-way product development relationship with the customers. Further, conventional methods may not provide accurate information about customer's needs, expectations, and desires during the actual everyday use of products and services, due to larger number of customers and different market segments. Further, the conventional methods may not adequately consider demographical elements or individual preferences for designing of the products or services.

SUMMARY

An embodiment of present disclosure includes a system, the system obtains a likeness score for one or more product attributes for a product using a survey before a design phase of the product, from at least one user. Further, the system determines an impact and a relative contribution of each product attribute from the obtained likeness score for one or more product attributes, for the at least one user, to an inclusivity score, using multi-level machine learning models. Furthermore, the system segregates the one or more product attributes and the inclusivity score at a persona level by combining the one or more product attributes and the inclusivity score, and subsequently determines a feature importance score of each feature in the one or more product attributes for each user, using the multi-level machine learning models.

The one or more product attributes include information that belongs to one or more product features. Further, the system calculates a risk score for each user indicating a sensibility toward product designer choices, by combining the feature importance score of each user with preferred design input from a product designer. Further, the system provides what-if analysis capabilities to the product designer for analyzing, based on the risk score, a risk of each user with the sensibility towards the product designer's choices. The risk score is converted into at least one category for providing the what-if analysis capabilities. Furthermore, the system receives a multisensory review from the at least one user using at least one of a facial coding, a voice tonality, for a physical view of an image of the product, and a haptics feedback from a haptics device for a virtual view of the product. Furthermore, the system computes an overall score by combining the feature importance score, the inclusivity score, the facial coding, the voice tonality, and the haptics feedback, to a granular level, and by varying the feature importance score, the inclusivity score, the facial coding, the voice tonality, and the haptics feedback for the product attributes by assigning different weights to the product attributes, the facial coding, the voice tonality, and the haptics feedback. Further, the system receives a product prototype from the product designer based on the overall score, and calculates a prototype inclusivity score based on receiving a prototype feedback from the at least one user for the product prototype. Further, the system outputs an iteratively enriched survey data for inclusive designing of products, based on the prototype inclusivity score and the overall score.

Another embodiment of the present disclosure may include a method, the method includes obtaining a likeness score for one or more product attributes for a product using a survey before a design phase of the product, from at least one user. Further, the method includes determining an impact and a relative contribution of each product attribute from the obtained likeness score for one or more product attributes, for the at least one user, to an inclusivity score, using multi-level machine learning models. Furthermore, the method includes segregating the product attributes and the inclusivity score at a persona level by combining the one or more product attributes and the inclusivity score, and subsequently determining a feature importance score of each feature in the product attributes for each user, using multi-level machine learning models.

The one or more product attributes include information that belongs to one or more product features. Additionally, the method includes calculating a risk score for each user indicating a sensibility towards product designer choices, by combining the feature importance score of each user, with a preferred design input from a product designer. Further, the method includes providing what-if analysis capabilities to the product designer, for analyzing, based on the risk score, a risk of each user with the sensibility towards the product designer's choices. The risk score is converted into at least one category for providing the what-if analysis capabilities. Furthermore, the method includes receiving a multisensory review from the at least one user using at least one of a facial coding, a voice tonality, for a physical view of an image of the product, and a haptics feedback from a haptics device for a virtual view of the product. Further, the method includes computing an overall score by combining the feature importance score, the inclusivity score, the facial coding, the voice tonality, and the haptics feedback, to a granular level, and by varying the feature importance score, the inclusivity score, the facial coding, the voice tonality, and the haptics feedback for the product attributes, by assigning of different weights to the product attributes, the facial coding, the voice tonality, and the haptics feedback.

Furthermore, the method includes receiving a product prototype from the product designer based on the overall score, and calculating a prototype inclusivity score based on receiving a prototype feedback from the at least one user for the product prototype. Further, the method includes outputting an iteratively enriched survey data for inclusive designing of products, based on the prototype inclusivity score and the overall score.

Yet another embodiment of the present disclosure may include a non-transitory computer-readable medium comprising machine-executable instructions that may be executable by a processor to obtain a likeness score for one or more product attributes for a product using a survey before a design phase of the product, from at least one user. Further, the processor determines an impact and a relative contribution of each product attribute from the obtained likeness score for one or more product attributes, for the at least one user, to an inclusivity score, using multi-level machine learning models. Furthermore, the processor segregates the one or more product attributes and the inclusivity score at a persona level by combining the one or more product attributes and the inclusivity score, and subsequently determines a feature importance score of each feature in the one or more product attributes for each user, using the multi-level machine learning models.

The one or more product attributes include information that belongs to one or more product features. Furthermore, the processor calculates a risk score for each user indicating a sensibility toward product designer choices, by combining the feature importance score of each user with a preferred design input from a product designer. Further, the processor provides what-if analysis capabilities to the product designer for analyzing, based on the risk score, a risk of each user with the sensibility towards the product designer's choices. The risk score is converted into at least one category for providing the what-if analysis capabilities. Furthermore, the processor receives a multisensory review from the at least one user using at least one of a facial coding, a voice tonality, for a physical view of an image of the product, and a haptics feedback from a haptics device for a virtual view of the product. Additionally, the processor computes an overall score by combining the feature importance score, the inclusivity score, the facial coding, the voice tonality, and the haptics feedback, to a granular level, and by varying the feature importance score, the inclusivity score, the facial coding, the voice tonality, and the haptics feedback for the product attributes by assigning different weights to the product attributes, the facial coding, the voice tonality, and the haptics feedback.

Furthermore, the processor receives a product prototype from the product designer based on the overall score, and calculates a prototype inclusivity score based on receiving a prototype feedback from the at least one user for the product prototype. Further, the processor outputs an iteratively enriched survey data for inclusive designing of products, based on the prototype inclusivity score and the overall score.

BRIEF DESCRIPTION OF DRAWINGS

FIG. 3G illustrates a schematic diagram for multisensory review from the at least one user using at least one of a facial coding, a voice tonality, for a physical view of an image of the product, and a haptics feedback from a haptics device for a virtual view of the product, respectively, according to an example embodiment of the present disclosure.

FIGS. 3O and 3P illustrate a schematic diagram of the output of a multi-sensory design review, according to an example embodiment of the present disclosure.

DETAILED DESCRIPTION

Figure 1:
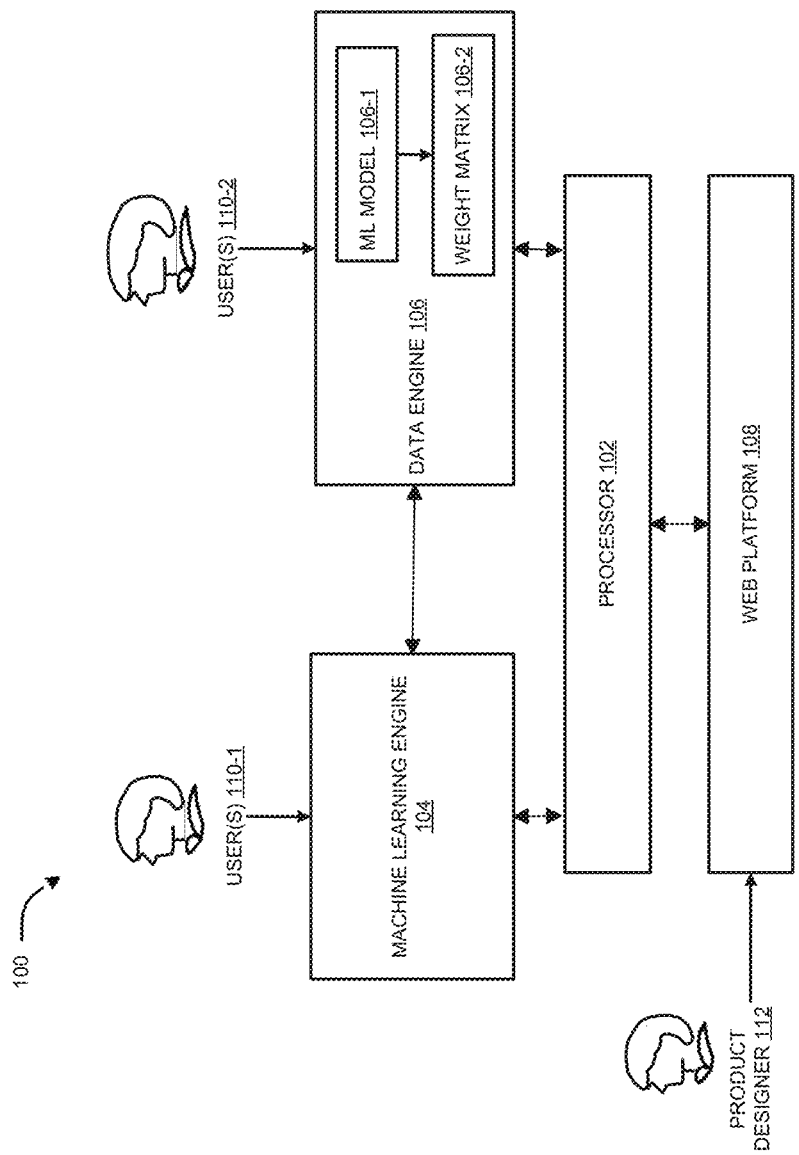
FIG. 1 illustrates a system for inclusive product design, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Various embodiments describe a system and a method for inclusive product design. The system obtains a likeness score for one or more product attributes for a product using a survey before a design phase of the product, from at least one user. For example, the survey may be a custom-made survey to capture inputs from every user segment and for different variants of a product. Further, the system determines an impact and a relative contribution of each product attribute from the obtained likeness score for one or more product attributes, for the at least one user, to an inclusivity score, using multi-level machine learning models. Furthermore, the system segregates the one or more product attributes and the inclusivity score at a persona level by combining the one or more product attributes and the inclusivity score. The one or more product attributes include information that belongs to one or more product features. Further, the importance of each feature may be obtained through any specific attribute using one or more coefficients of the attributes. The larger the coefficient value (both in the positive and negative direction), the greater the effect of the corresponding feature on the inclusive product design. Further, the system determines a feature importance score of each feature in the one or more product attributes for each user, using the multi-level machine learning models.

Further, the system calculates a risk score for each user indicating a sensibility towards product designer choices, by combining the feature importance score of each user with a preferred design input from a product designer. Further, the system provides what-if analysis capabilities to the product designer for analyzing, based on the risk score, a risk of each user with the sensibility towards the product designer's choices. The risk score is converted into at least one category for providing the what-if analysis capabilities. Furthermore, the system receives a multisensory review from the at least one user using at least one of a facial coding, a voice tonality, for a physical view of an image of the product, and a haptics feedback from a haptics device for a virtual view of the product.

Further, the system computes an overall score by combining the feature importance score, the inclusivity score, the facial coding, the voice tonality, and the haptics feedback, to a granular level, and by varying the feature importance score, the inclusivity score, the facial coding, the voice tonality, and the haptics feedback for the product attributes by assigning different weights to the product attributes, the facial coding, the voice tonality, and the haptics feedback. Furthermore, the system receives a product prototype from the product designer based on the overall score, and calculates a prototype inclusivity score based on receiving a prototype feedback from the at least one user for the product prototype. Further, the system outputs an iteratively enriched survey data for inclusive designing of products, based on the prototype inclusivity score and the overall score.

Embodiments herein may enable more efforts and procurement, which adds up across teams to build a highly focused prototype of the product. Further, there may be a large collaborative team from Small Medium Enterprises (SMEs), experts (industry), architects (labs), to data scientists (Artificial Intelligence (AI) capability) for an inclusive product design. Further, inclusive product design may lead to an increase in sales in the consumer goods category. Further, the embodiments herein may consider the importance of features for the one or more product attributes such as visual, form factor, motor skills, readability, and the like.

Furthermore, the embodiments herein may consider implications of demographic elements, on inclusive product design. Also, the embodiments herein may consider virtual personas at the highest risk and inclusivity levels, for inclusive product design. In addition, the embodiments herein may consider multi-sensory review, which includes verbal, Electroencephalogram (EEG), facial coding, and voice tonality on a real prototype of the product. Embodiments herein may enable early experimentation with virtual product design using multi-sensory reviews of real and virtual product feedback using verbal feedback for an Extended Reality (XR) view of product and haptics feedback from a haptic device. Embodiments herein may use multi-level models to determine the importance of each attribute for each persona, and for overall data, irrespective of personas, to determine how the one or more product attributes are impacting the inclusivity of each persona.

FIG. 1 illustrates a system 100 for inclusive product design according to an example embodiment of the present disclosure. The system 100 may be implemented by way of a single device or a combination of multiple devices that may be operatively connected or networked together. The system 100 may be implemented in hardware or a suitable combination of hardware and software. The system 100 includes a processor 102. The system 100 may include a machine learning engine 104, a data engine 106, and a web platform 108. The data engine 106 may further include a ML model 106-1, and a weight matrix 106-2. The ML model 106-1 may calculate one or more weights for one or more feedback from a first user 110-1, and a second user 110-2 (hereinafter referred to as "user 110-1" and "user 110-2"). The ML model generate a dynamic weight matrix 106-2 for each attribute and feedback combination from history feedback data. Further, the ML model 106-1 may scale the weight so that sum of weights is 1.

The first user 110-1, and the second user 110-2 may be associated with a suitable computing device (not shown in FIG. 1), and multi-sensory device (not shown in FIG. 1), respectively which may be communicatively coupled to the system 100 via the Machine Learning (ML) engine 104, and the data engine 106, respectively.

The system 100 may be a hardware device including the processor 102 executing machine-readable program instructions to provide inclusive product design. Execution of the machine-readable program instructions by the processor 102 may enable the proposed system 100 to achieve an inclusive product design. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, feature extraction, and/or any other functions. Any reference to a task in the present disclosure may refer to an operation being or that may be performed on data.

In an example embodiment, the processor 102 may obtain, via the Machine Learning (ML) engine 104, a likeness score for one or more product attributes for a product using a survey before a design phase of the product, from at least one user (e.g., user 110-1) of a plurality of users. The likeness score may be a user rating for each product attribute of a product. In an example embodiment, the likeness score may be a numerical value ranging from 1 to 5. The likeness score may be obtained from the user 110-1 via a survey. In an alternative embodiment, the likeness score may be obtained via a user interview. For example, the survey may be customized for each product type or as per the product variant. 110-1, or according to the product variant relevant to the user 110-1. In an example embodiment, the product includes, but is not limited to, consumer goods (e.g., bottles, packages), industry tools (e.g., power tools, surgical equipment), automobile components (e.g., steering wheel, gear shift, seats), retail products (e.g., beauty products, store design, advertisement), media items (e.g., magazines, rich content, movies), high technology products (e.g., medical equipment, speech recognition), chemicals (e.g., perfumes, paints), software and platforms (e.g., applications, emojis), and the like.

In an example embodiment, the one or more product attributes are pre-processed by the Machine Learning (ML) engine 104, by different approaches such as handling missing values, performing univariate and bivariate analysis, skewness analysis, and feature creation. The missing values may be the values or data that is not stored (or not present) for some variable/s in the survey. The missing values may be handled either based on deleting the missing values or imputing (i.e., a process of replacing missing data with substituted values) the missing values. Further, univariate analysis may be the analysis of one ("uni") variable, and the bivariate analysis may be the analysis of two variables. The skewness analysis is performed to analyze distortion or asymmetry that deviates from the symmetrical bell curve, or normal distribution, in the input data such as the survey data. If the curve is shifted to the left or to the right, the curve is considered to be skewed. Furthermore, the feature creation may involve identifying the variables that may be most useful in achieving the inclusive product design.

Additionally, the product attributes comprise, but are not limited to, a shape, a size, a color, a grip, a weight, a balance, motor skills, a readability across multiple inclusion dimensions, and the like. Furthermore, the multiple inclusion dimensions comprise, but are not limited to, an age, demographic data, preferences of certain segment or type of individuals, and the like.

In an example embodiment, the processor 102 may determine an impact and a relative contribution of each product attribute from the obtained likeness score for one or more product attributes, for the at least one user 110-1, to an inclusivity score, using multi-level machine learning models. Furthermore, the processor 102 may segregate the one or more product attributes and the inclusivity score at a persona level by combining the one or more product attributes and the inclusivity score. The one or more product attributes include information that belongs to one or more product features. Furthermore, the importance of each feature may be obtained through any specific attribute using one or more coefficients of the attributes. The larger the coefficient value (both in the positive and negative direction), the greater the effect of the corresponding feature on the inclusive product design.

For example, weights or coefficients of one or more product attributes determine the effect of the corresponding feature on the inclusive product design. In another example, the best feature may be the one that has the highest information gain or more weight. Therefore, these measures can be used as feature importance scores. In addition, when a product designer 112 receives an importance of each feature, the product designer 112 uses the feature importance score and provides design attributes/prototype of the product. The design attributes/prototype may be used to calculate a final risk score for the user 110-1.

Furthermore, the processor 102 may determine a feature importance score of each feature in the one or more product attributes for each user 110-1, using the multi-level machine learning models. In an example embodiment, the feature importance score may be determined based on scaling a product attribute importance score from the multi-level machine learning models, into a range. Further, the feature importance score may be determined based on linear regression on the product attributes, the segregated product attributes, the inclusivity score, and a decision tree for each of the product attribute for each user 110-1. The multi-level machine learning models may be trained by the ML engine 104 for product attributes and feedback received from the plurality of users.

In an example embodiment, the processor 102 may calculate a risk score for each user indicating a sensibility towards product designer choices, by combining the feature importance score of each user with a preferred design input from a product designer 112 using the web platform 108. Further, the processor 102 may provide what-if analysis capabilities to the product designer 112 via the web platform 108, for analyzing, based on the calculated risk score, a risk of each user with the sensibility towards the product designer's choices or input. In an example embodiment, the risk score may be converted into at least one category for providing the what-if analysis capabilities. In an example embodiment, converting the risk score into at least one category may be based on a pre-defined threshold for each category.

In an example embodiment, the processor 102 may receive a multisensory review from the at least one user (e.g., user 110-2), using at least one of a facial coding, a voice tonality, for a physical view of an image of the product, and a haptics feedback from a haptics device (not shown in FIG. 1) for a virtual view of the product. Further, the processor 102 may compute an overall score by combining the feature importance score, the inclusivity score, the facial coding, the voice tonality, and the haptics feedback, at various levels of granularities. In an example embodiment, the processor 102 may compute an overall score by varying the feature importance score, the inclusivity score, the facial coding, the voice tonality, and the haptics feedback for the product attributes by assigning different weights to the product attributes, the facial coding, the voice tonality, and the haptics feedback. In an example embodiment, for computing the overall score, the processor 102 may initially calculate an emotional inclination for the facial coding and voice tonality and scale the emotional inclination to a same level as that of the feature importance score. In an example embodiment, the level of the feature importance score includes the amount of details and distinct parts of one or more features of the product. The emotional inclination may be captured for the whole conversation, but survey feedback may be captured at an attribute level. In an example embodiment, the amount of details of emotions may need to be brought down to the same granular level as that of the granular level of the feature importance score.

In an example embodiment, the processor 102 may combine scaled emotional inclination with the prototype feedback at a product attribute level using a data-driven smart weight matrix 106-2. The weight matrix 106-2 may capture a relevance of each feedback/input for each product attribute. In an example embodiment, the processor 102 may combine the feature importance score and the inclusivity score to calculate an overall inclusivity score. Furthermore, the processor 102 may calculate the inclusivity score for the product and the at least one user, by combining the haptics feedback with the calculated overall inclusivity score, and the prototype inclusivity score.

In an example embodiment, the processor 102 may receive a product prototype from the product designer 112 based on the overall score, and may calculate a prototype inclusivity score based on receiving a prototype feedback from the at least one user (e.g., user 110-2) for the product prototype. In an example embodiment, the processor 102 may output an iteratively enriched survey data for inclusive designing of products, based on the prototype inclusivity score and the overall score. In an example embodiment, the output may include dashboards and scorecards with a per-user inclusivity score and a per prototype inclusivity score.

Figure 2:
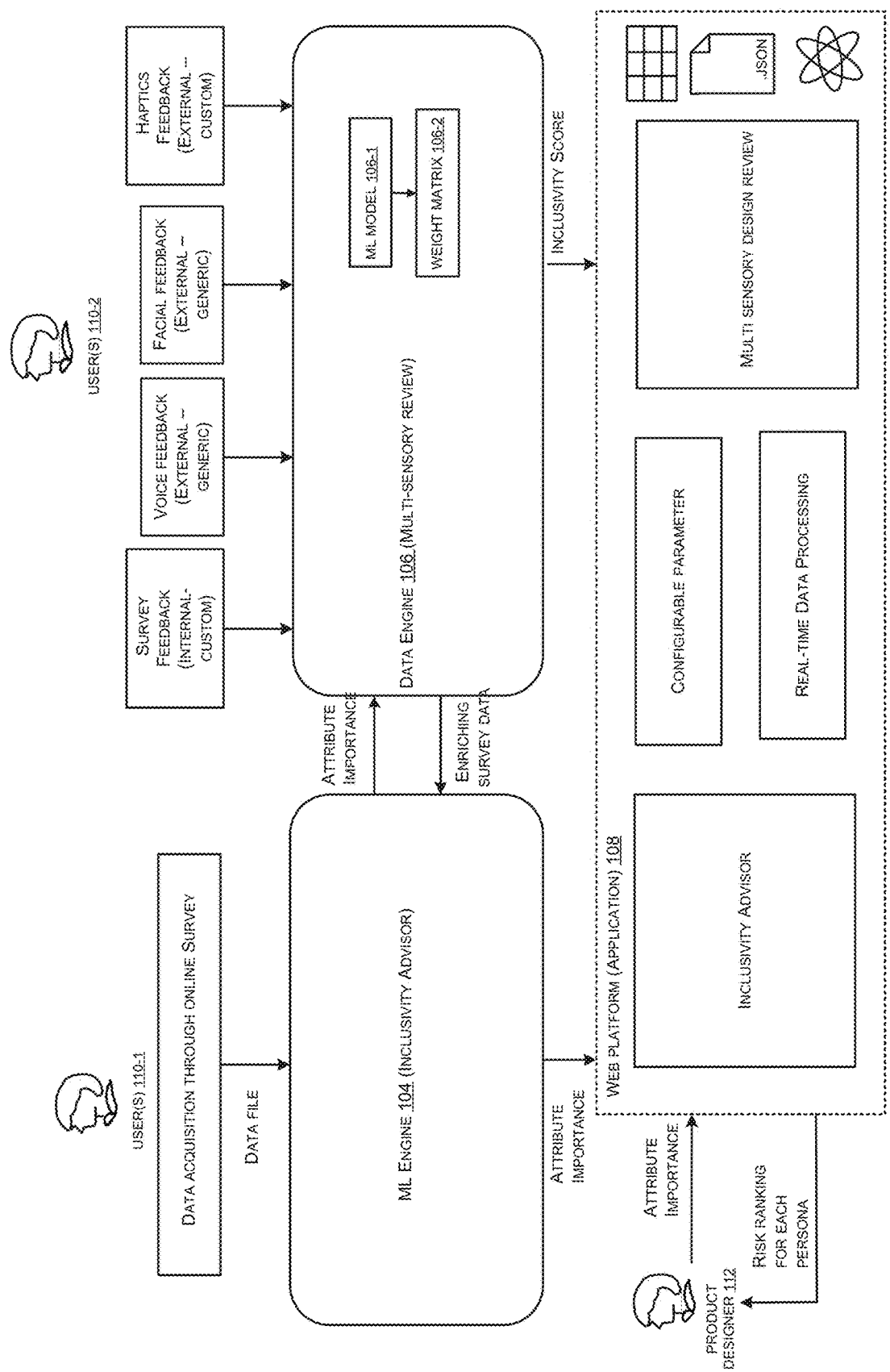
FIG. 2 illustrates a flow diagram depicting components of the system of FIG. 1, according to an example embodiment of the present disclosure.

FIG. 2 illustrates a flow diagram depicting components of the system of FIG. 1, according to an example embodiment of the present disclosure. The ML engine 104 may obtain data associated with one or more product attributes such as, but are not limited to, shape, size, color, grip, weight, balance, motor skills, and readability across multiple inclusion dimensions such as age, and the like through a custom-developed survey, and the like. The ML engine 104 may require data associated with the impact of product attributes across inclusion dimensions to conduct exploratory research and further develop ML models. To this end, the processor 102 prompts a plurality of respondents such as users 110-1 to respond to a web-based customized questionnaire that captures the impact of product attributes on determining the acceptance or ease of adoption of the product on a 5-point Likert scale. For example, the processor 102 obtains usage kinesthetic feedback such as the grip of a bottle, a feedback on ergonomics of the bottle, a feedback on a perceived friction of the bottle when held from the trunk, or a feedback on the texture or the feel of the bottle on the fingers when holding from the neck. Further, the ML engine 104 may perform data pre-processing for the data received through the survey. In an example embodiment, data pre-processing may include, but is not limited to, handling missing values, performing univariate and bivariate analysis, skewness analysis, feature creation, ML training, model training, model validation, and the like.

Further, the ML engine 104 may determine an impact and a relative contribution of each product attribute from the obtained likeness score for one or more product attributes, for the at least one user 110-1, to an inclusivity score, using multi-level machine learning models. In an example embodiment, the users 110-1 may like a feature in isolation, but it may not be necessary that the feature may contribute to inclusivity. The importance of each feature may not be captured in the survey, and no previous indicators/findings may be available which could be used readily for further analysis. To capture the importance of each product feature and its impact, the ML engine 104 implements a multi-level machine learning model. The multi-level machine learning models may help in determining an importance of each feature for each persona, and each product attribute's relative contribution to the inclusivity score.

Figure 3A:
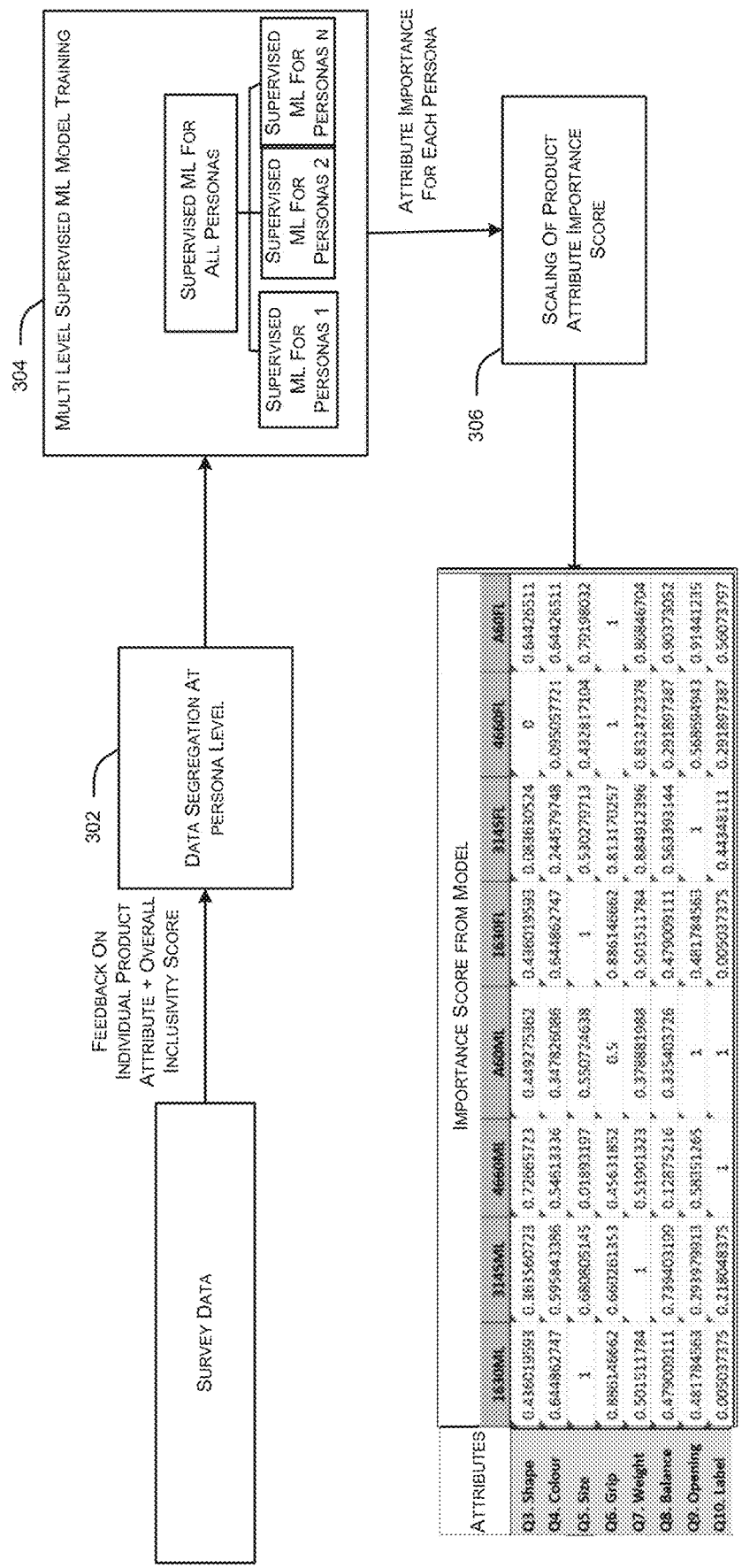
FIG. 3A illustrates a flow diagram for calculating an importance score, according to an example embodiment of the present disclosure.

In an example embodiment, the ML engine 104 may use supervised ML at a higher level (all personas) to find out how one or more product attributes impact the inclusivity score for a sample population irrespective of their personas. In an example embodiment, the ML engine 104 segregates the data at the persona level and implements a supervised ML model to find the feature importance score for each attribute at persona level, as shown in FIG. 3A. For example, at step 302, the data from the survey is obtained which includes the likeness score for one or more product attributes and the determined inclusivity score. The data is segregated at the persona level so that attribute importance can be derived separately for each persona. In a component 304, the supervised ML models may be trained first for overall data and second for each persona. Because there is no fixed range of the feature importance score, at step 306, a scaling converter (not shown in FIGs.) may convert the feature importance score that lies in a range of 0-1 and each attribute gets a relative importance score as shown in a table of FIG. 3A.

Figure 3B:
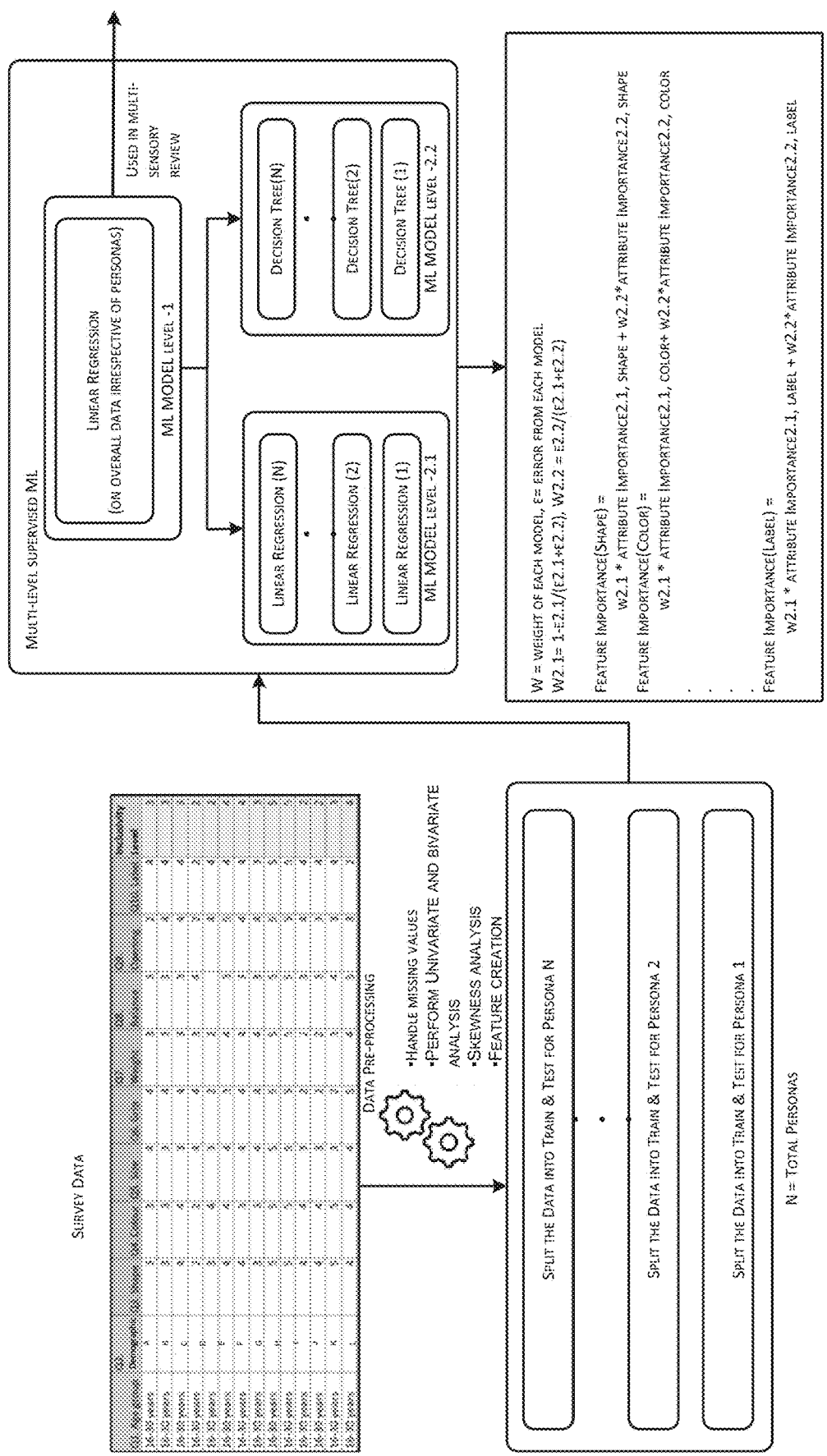
FIG. 3B illustrates an example flow diagram of calculating a feature importance score for each feature, according to an example embodiment of the present disclosure.

In another example, the feature importance score for each feature may be calculated as shown in FIG. 3B. The ML engine 104 may perform a pre-processing on the survey data by using one or more approaches such as handling missing values, performing univariate/bivariate analysis, skewness analysis, and feature creation. The pre-processed data may be split into train and test data for persona 1 to persona 'N', where the term 'N' may refer to the total count of personas (i.e., users 110-1, 110-2). Further, the multilevel supervised ML model of the ML engine 104 may perform linear regression on overall data irrespective of a number of personas using ML model level 1. The linear regression data may be used in the multi-sensory review received from the at least one user 110-2. In an example embodiment, the linear regression data for overall personas may be split to perform linear regression for each persona using ML model level 2.1. The linear regression data for overall personas may be split to feed into an individual decision tree for each persona, using a ML model level 2.2.

The multi-level ML models may be used to determine the details of how attributes are impacting the inclusivity of the persona. The survey data may be named for each persona as shown in a table of FIG. 3B. In an example embodiment, the ML engine 104 may capture the survey data for a different age of persona and determine, how each persona like each attribute and how much inclusion/inclusivity (i.e., based on inclusivity score) is felt by each persona. Further, the ML engine 104 processes the survey data and splits the processed survey data.

Further, the ML engine 104 may determine the weight (W) of each model and error (e) from each model as shown in equation 1 below:

$$W^{2.1} = \frac{1 - e^{2.1}}{e^{2.1} + e^{2.2}}, W^{2.2} = \frac{e^{2.2}}{e^{2.1} + e^{2.2}} \quad \text{Equation 1}$$

Further, the feature importance shape is shown in equation 2 below:

Feature Importance (Shape)=$W^{2.1}$*attribute importance$^{2.1,shape}$+$W^{2.2}$*attribute importance$^{2.2,shape}$     Equation 2

The feature importance for color is shown in equation 3 below:

Feature Importance (color)=$W^{2.1}$*attribute importance$^{2.1,color}$+$W^{2.2}$*attribute importance$^{2.2,color}$     Equation 3

The feature Importance of the label is shown in equation 4 below:

Feature Importance (label)=$W^{2.1}$*attribute importance$^{2.1,label}$+$W^{2.2}$*attribute importance$^{2.2,label}$     Equation 4

Figure 3C:
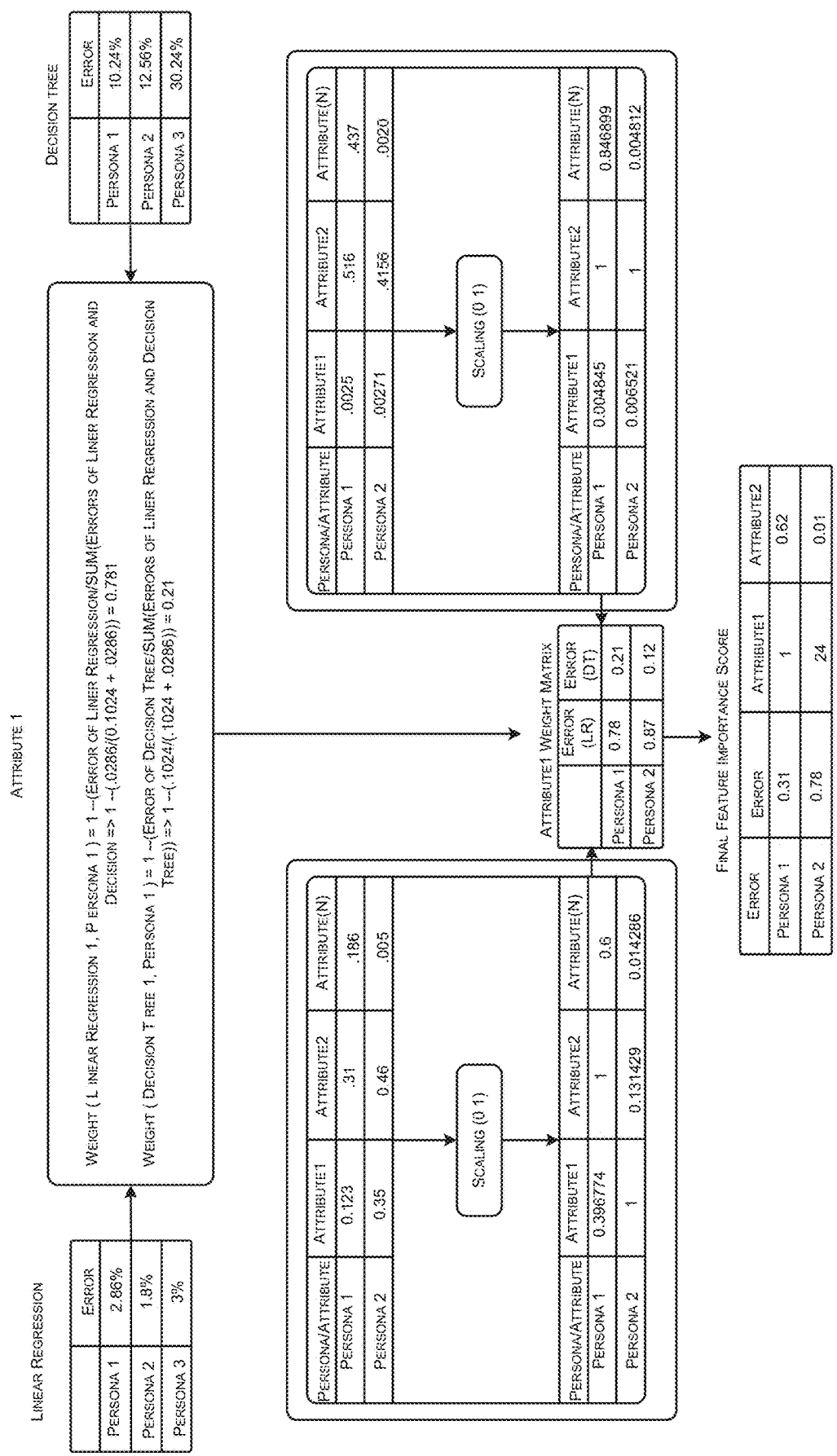
FIG. 3C illustrates an example flow diagram of calculating the overall feature importance score, according to an example embodiment of the present disclosure.

Further, the ML engine 104 may calculate an overall/final feature importance score as shown in FIG. 3C. From the linear regression and decision tree, the error for each persona may be obtained for calculating the weight of each model for each product attribute as shown in equation 5A and 5B below:

Weight (Linear Regression 1, Persona 1) =

$$1 - \left( \frac{\text{Error of Liner Regression}}{SUM(\text{Errors of Liner Regression and Decision Tree})} \right)$$

Equation 5A

Weight (Decision Tree 1, Persona 1) =

$$1 - \left( \frac{\text{Error of Decision Tree}}{SUM(\text{Errors of Liner Regression and Decision Tree})} \right)$$

Equation 5B

For example,

Weight (Linear Regression 1,Persona 1)=1−(0.0286/(0.1024+0.0286))=0.781.

In another example,

Weight (Decision Tree 1,Persona 1)=1−(0.1024/(0.1024+0.0286))=0.21

In addition, a weight matrix for each attribute may be calculated based on the weights calculated, the feature importance score from linear regression, and the feature importance score from the decision tree. The feature importance score for each attribute and each persona may be scaled (0-1) using the scaling converter. Further, the weight matrix provides the final feature importance score to understand how each person receives or perceives each attribute of the product.

Figure 3D:
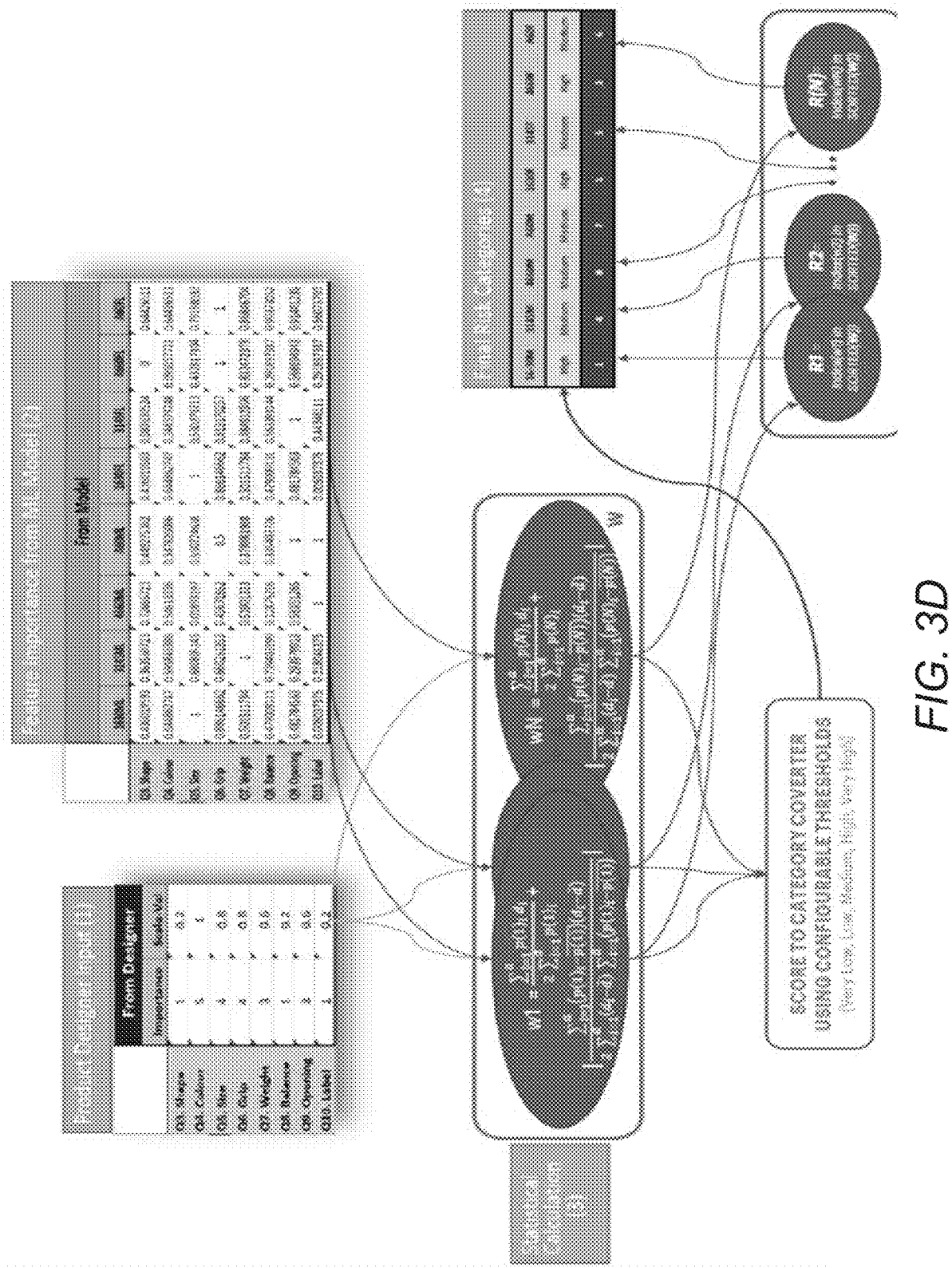
FIG. 3D illustrates an example flow diagram of calculating a risk score, according to an example embodiment of the present disclosure.

Furthermore, FIG. 3D provides a flow diagram for calculating a risk score. The processor 102 may calculate the risk score for each user indicating a sensibility towards product designer choices, by combining the feature importance score of each user with a preferred design input from the product designer 112. The risk score is calculated using equation 6 below:

$$w = \frac{\sum_{i=N}^{a} p(N)i d_i}{2 \sum_{i=N}^{a} p(N)i} + \left| \frac{\sum_{i=N}^{a} (p(N)i - \overline{p(1)})(d_i - \overline{d})}{2 \sum_{i=N}^{a} (d_i - \overline{d}) \sum_{i=N}^{a} (p(N)i - \overline{p(1)})} \right| \quad \text{Equation 6}$$

In the above equation 6, the variable 'w' may refer to calculated risk score for a persona, the variable 'd' may refer to designer importance score, the term 'a' may refer to total no of attributes, the variable 'd' may refer to maximum score assigned by designer, the variable "p(N)" may refer to feature importance score for persona 'N', the variable '$\overline{p(N)}$' may refer to maximum feature importance score for persona 'N'.

The processor 102 may combine the data from the product designer 112, and the feature importance score from ML model, to calculate the risk associated with the feature of the product. For example, the product designer 112 may want to change the color to neon and may assign some particular personas in the risk category when the product designer 112 thinks about the color change. When the personas respond with "I don't want to change the color", then the color may not be changed by the product designer 112. The ML machine 104 may convert the risk score into a category-based on a threshold value. The threshold may be configurable. For instance, the ML machine 104 may plot relative distribution of all the inputs received through survey data. Everything is distributed between, for example, one and five, one being lowest and five being highest, then the representative ranges may be very low, low, medium, high, and very high. The categories may be very low, low, medium, high, or very high. The final risk categories are then provided to the product designer 112.

Figure 3E:
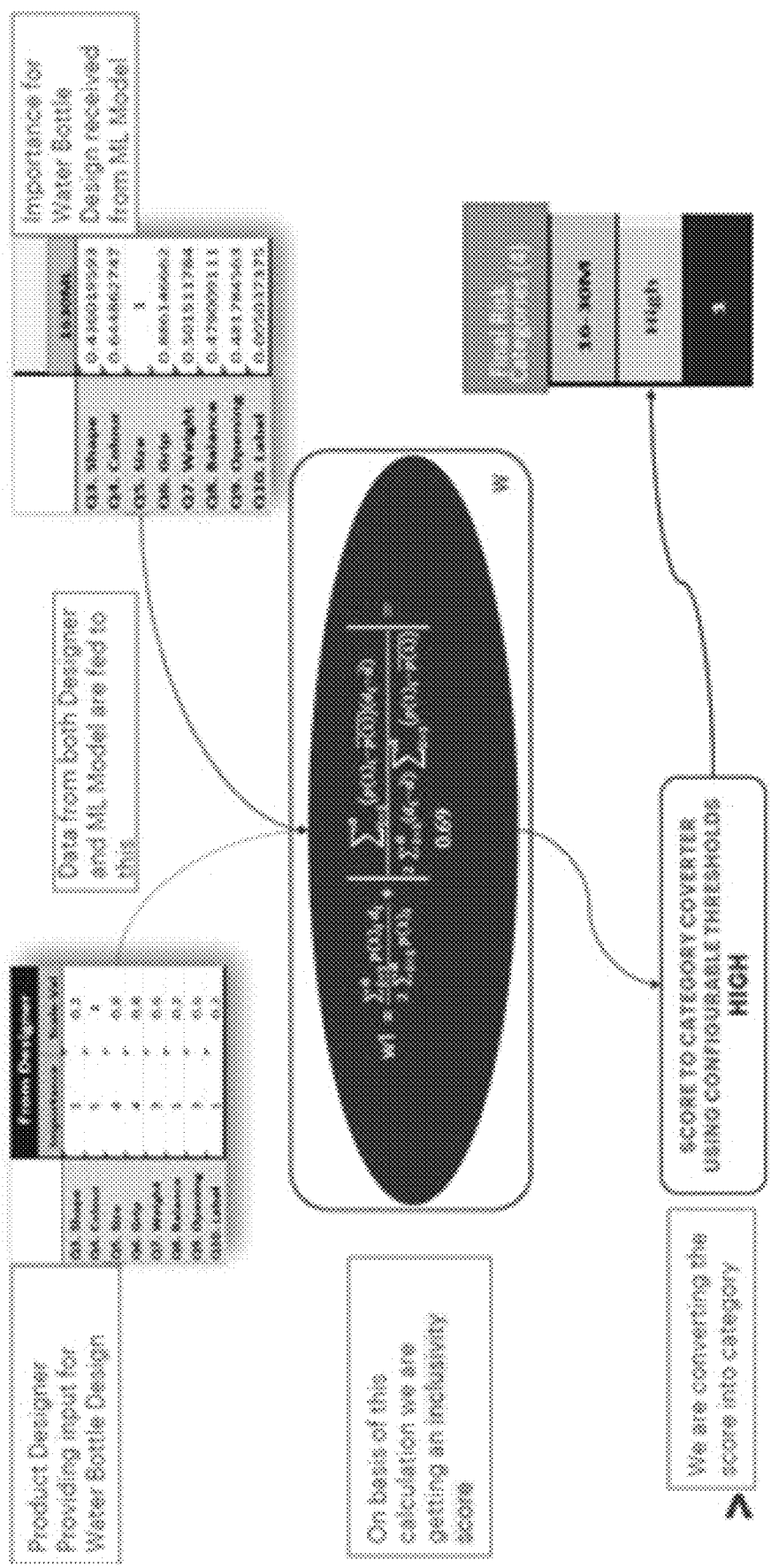
FIG. 3E illustrates an exemplary scenario of a persona in the age group of 16-30 reviewing a water bottle, according to an example embodiment of the present disclosure

For example, consider an exemplary scenario of persona aged between 16-30 reviewing a water bottle as shown in FIG. 3E. In the design phase, the product designer 112 can input individual preferences and provide a score for each product attribute. The preference score indicates the magnitude of deviation from usual design choices available in the market. When the new product is in the design phase, the processor 102 uses the feature importance score and combines the feature importance score with the designer's preferences to calculate a risk score for each persona. Further, the statistical calculation on both designer preferences and feature importance score is performed to calculate the risk score to know which personas are highly impacted by designers' choices. Then the ML machine 104 may convert risk score into risk categories—very high, high, medium, low, and very low. One of ordinary skill in the art will appreciate that the threshold values for each category are configurable.

Further, the processor 102 may provide what-if analysis capabilities to the product designer for analyzing, based on the risk score, a risk of each user with the sensibility towards the product designer's choices. The processor 102 provides what-if analysis capabilities, based on converting the risk score into at least one risk category. Rather than analyzing one set of results based on the designer's preferences and showing a static set of data, the dynamic calculations may allow the product designer to perform a multi-scenario analysis of multiple products.

Figure 3F:
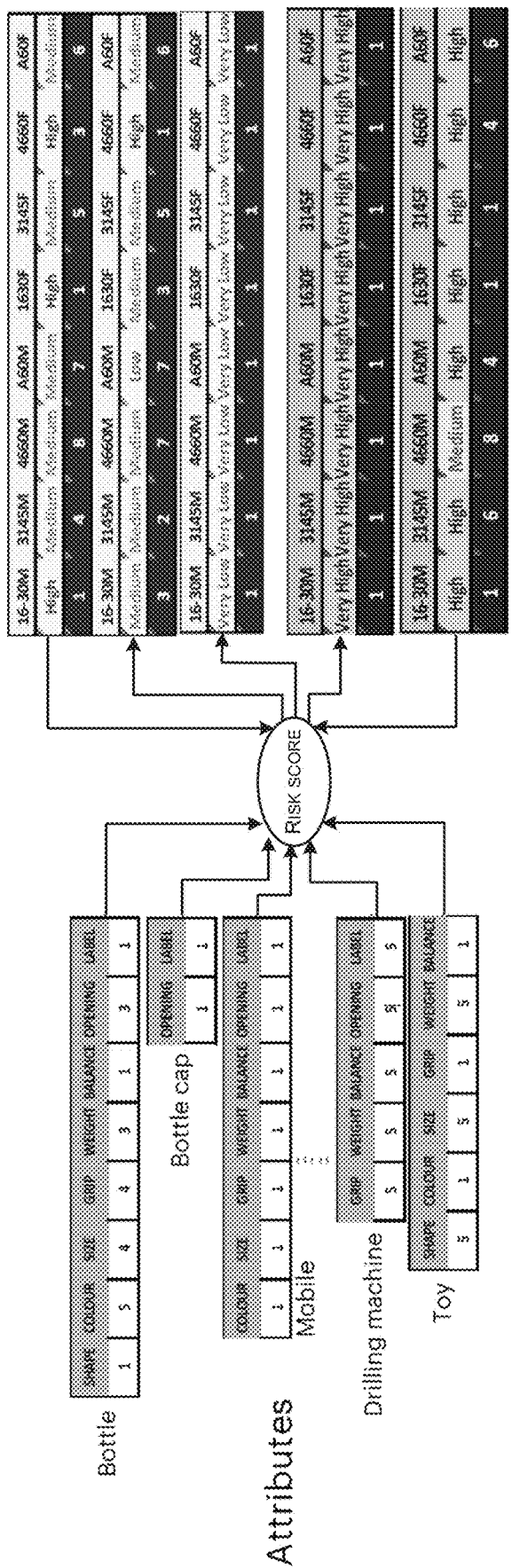
FIG. 3F illustrates an exemplary scenario of what-if-analysis based on product designer preferences, according to an example embodiment of the present disclosure.

FIG. 3F provides an exemplary scenario of what-if-analysis based on product designer preferences. The risk score may change with the product designer's input. Further, the processor 102 may provide what-if analysis capabilities to product designer's choice of the attributes to work upon. The product designer 112 can select a preference score for each attribute and can find out which personas are at risk responsive to his/her choices. Based on the analysis, the product designer 112 can be enabled to:

a) understand if the designer's choice will cater to the targeted consumers.
b) ensure that risk personas are included in the testing phase to evaluate the impact.
c) determine the choices that he/she can make to avoid putting many personas at risk.

Furthermore, the number of choices available for the product designer 112 may be denoted by length(R) N, where R=length of the range of the ratings, and where N=total number of attributes.

Additionally, the processor 102 may leverage the combinatorial power of technologies to perform multi-sensory reviews for the product in the physical world. In an example embodiment, the processor 102 may receive a multisensory review from the at least one user 110-2 using at least one of a facial coding, a voice tonality, for a physical view of an image of the product, and a haptics feedback from a haptics device for a virtual view of the product. For example, the haptics device is shown in FIG. 3G captures haptic feedback, and a camera captures the facial coding, a voice tonality of the user 110-2, when a physical view of an image of the product is displayed on a display device. Techniques such as the facial coding and the voice tonality may be applied to reactions of respondents when they are presented with the images of the product to analyze their opinion on the product attributes. Further, reaction or response from the respondents regarding the opinion on the products, may be captured on a 5-point Likert scale as the review/feedback survey data.

This exercise may be conducted to obtain data regarding respondents' facial emotion score, speech emotions score, grip, weight, shape, and size feedback. The respondents' feeling is determined using Electro-Encephalogram (EEG)/neurosensory. The expressions are determined using facial coding and voice tonality is determined using voice analytics, and force on a product is determined using a haptic device. The product may be simulated to the user 110-2 using an Extended Reality (XR)/Virtual Reality (VR) device. The haptics device may capture the haptics feedback for grip, weight, shape, and size of the product simulated in the virtual world using an XR/VR device. Further, an Extended Reality (XR) technique may be used to capture the haptic feedback on the grip, weight, shape, and size of the virtual prototype on a 5-point Likert scale.

Figure 3H:
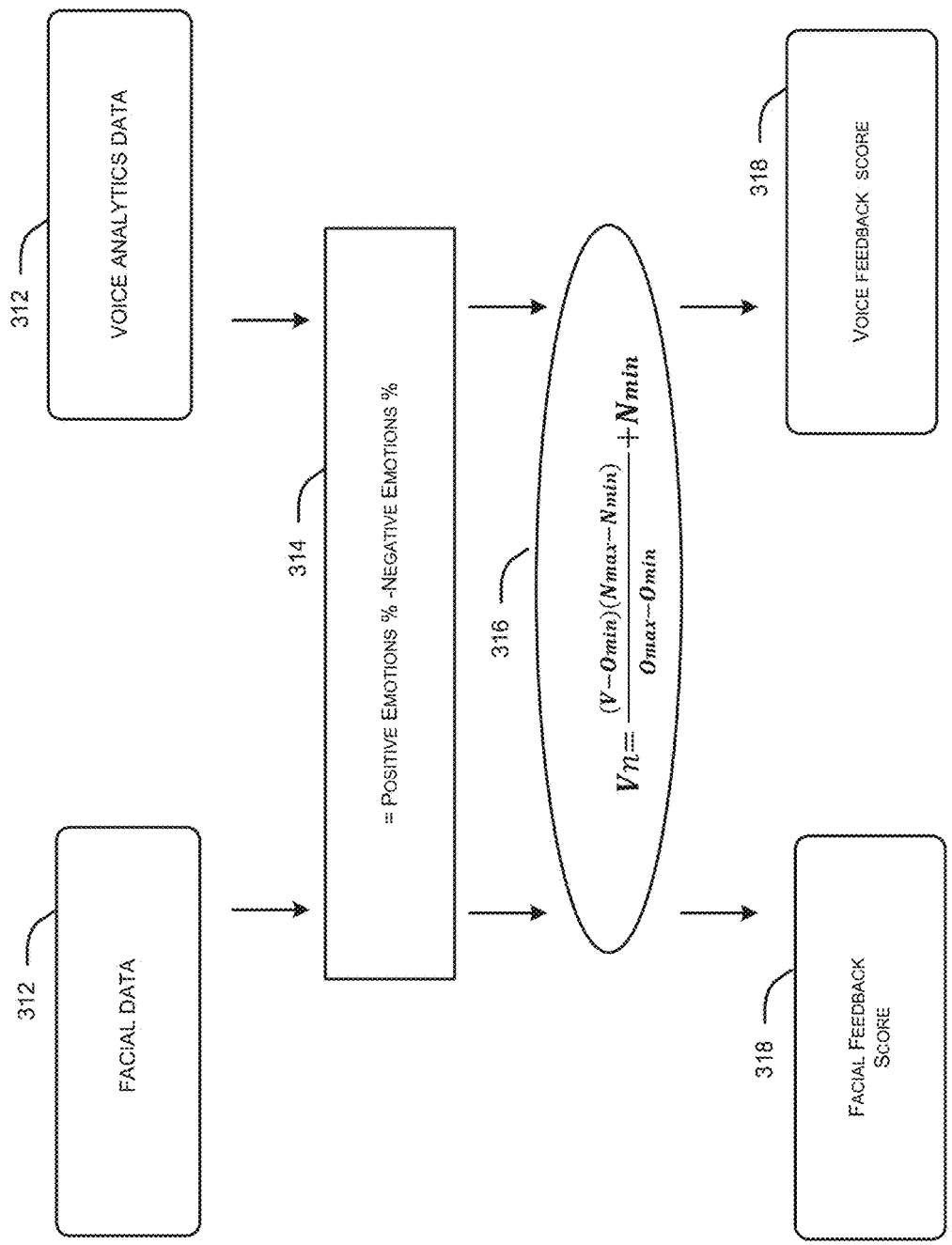
FIG. 3H illustrates a flow diagram for calculating emotional inclination score, according to an example embodiment of the present disclosure.

Further, for computing the overall score, the processor 102 may initially calculate an emotional inclination for the facial coding and voice tonality and scale the emotional inclination to a same level as that of the feature importance score. As shown in FIG. 3H, at step 312, the processor 102 calculates emotional inclination based on facial expression and voice tonality analysis data captured from different applications. The responses to the feedback can be tracked from different possible channels to capture holistic feedback for a prototype. At step 314, the positive and negative scores may be calculated in terms of percentages, which may be used to calculate the overall emotional inclination of the conversation. At step 316, the processor 102 converts the calculated emotional inclination score in the range of "−1" to "+1", into the same range as the survey data. The range may be converted using equation 7 below:

$$V_n = \frac{(V - O_{min})(N_{max} - N_{min})}{O_{max} - O_{min}} + N_{min} \qquad \text{Equation 7}$$

In the above equation 7, the variable 'Vn' may refer to the calculated value in the new range, the variable V may refer to the old value, 'Omin' may refer to the minimum value of the old range, the variable 'Nmin' may refer to the minimum value of the new range, the variable 'Omax' may refer to a maximum value of the old range, the variable 'Nmax' may refer to a maximum value of the new range.

At step 318, the calculated facial feedback score and voice feedback score may be determined.

Figure 3I:
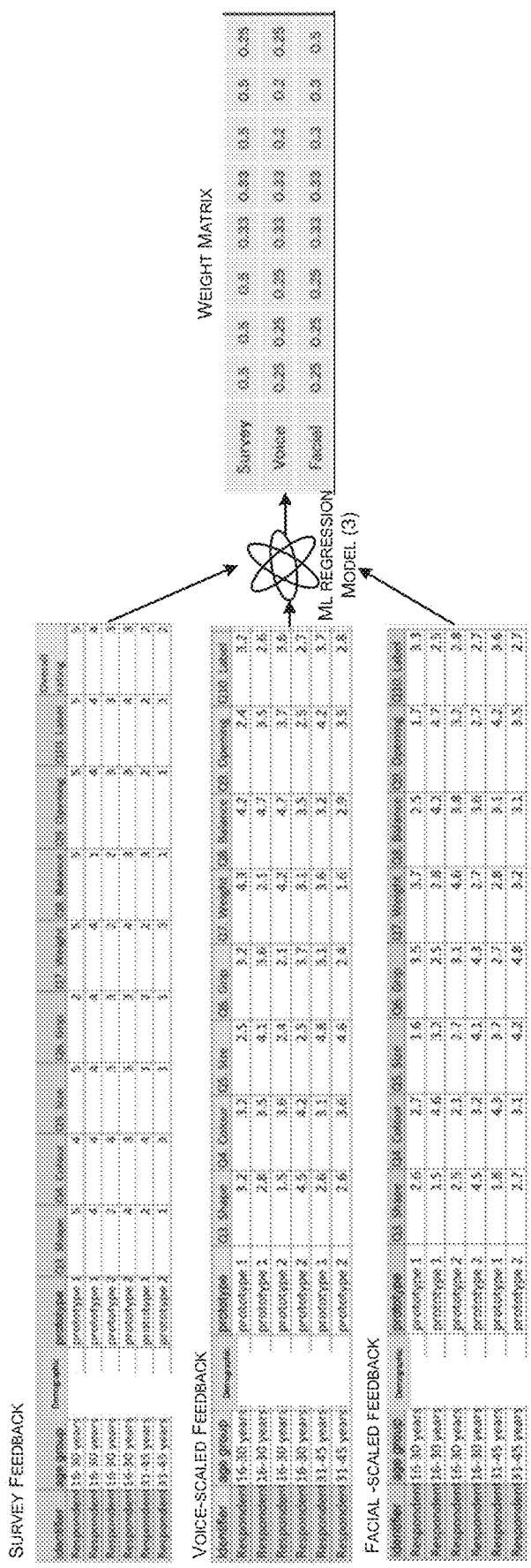
FIG. 3I illustrates a flow diagram for determining a weight matrix, according to an example embodiment of the present disclosure.

In addition, the processor 102 may combine scaled emotional inclination with the prototype feedback at a product attribute level using a data-driven smart weight matrix 106-2. The voice and facial feedback score may be used to modify the survey feedback score at the attribute level. However, the magnitude of change may be varied because of different weights, which may be assigned for a particular attribute and feedback mechanism. Here, the ML regression model calculates the weights as shown in FIG. 3I. Further, the range of overall rating may be between, for example, 1 to 5. As shown in FIG. 3I the ML regression model generates dynamic weights for each attribute and feedback mechanism combination from the history feedback data. Further, ML regression model may scale the weight so that sum of weights is 1.

Figure 3J:
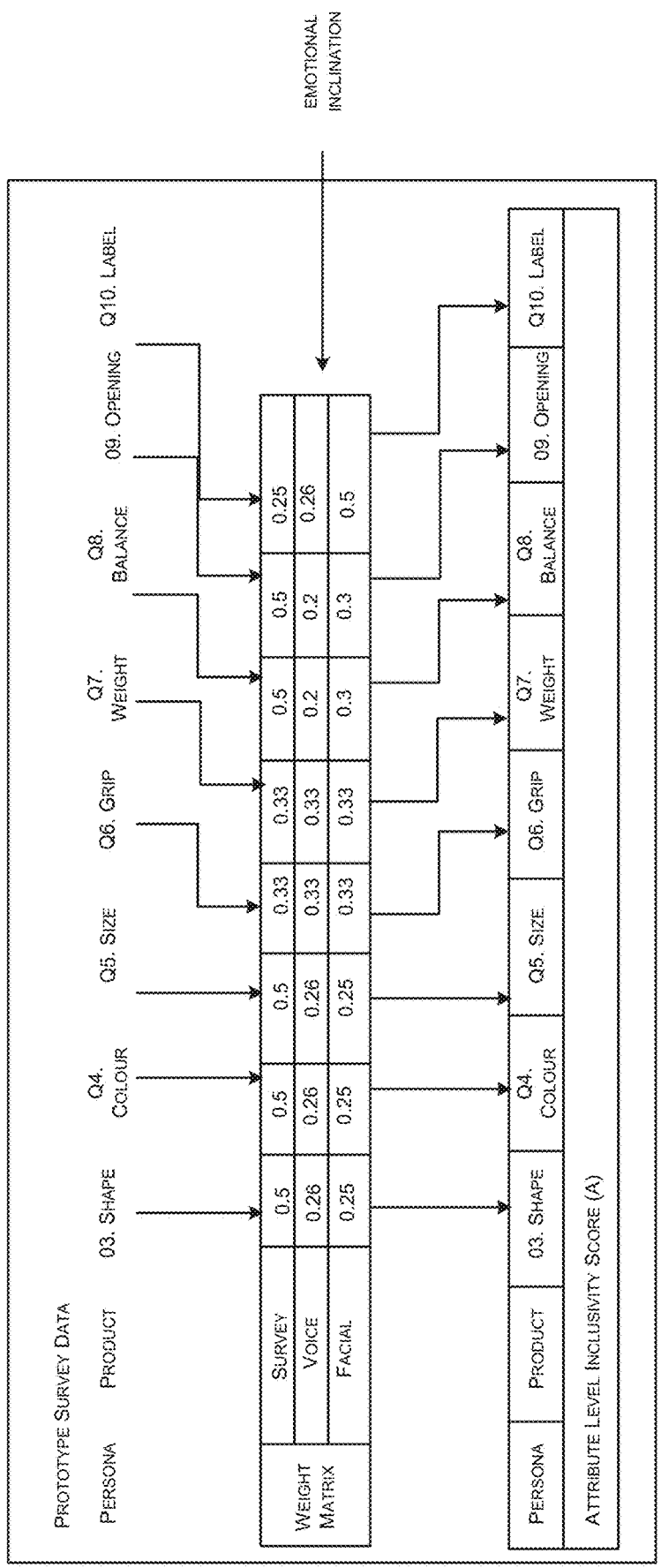
FIG. 3J illustrates a flow diagram for calculating attribute level inclusivity score, according to an example embodiment of the present disclosure.

FIG. 3J illustrates a flow diagram for calculating attribute level inclusivity score, according to an example embodiment of the present disclosure. For the weight matrix, the survey data, the voice data and the facial data are combined to determine the attribute level inclusivity score. Because the score from emotional inclination score is on the overall conversation, emotional inclination score may be used at the attribute level to calculate the new attribute scores. Accordingly, to calculate the attribute scores, the ML model calculates a weight matrix "i". The weights are distributed considering the relative importance of the mediums of data being captured, and the sum of the distribution is equal to 1. The Attribute level inclusivity score (A) is calculated according to equation 8 below:

$$\text{Attribute level inclusivity score}(A) = \sigma i = 1 N w i * a i \quad \text{Equation 8}$$

In the above equation 8, the variable 'N' may refer to feedback channels, the variable 'w' may refer to channel weight from the weight matrix, and the variable 'a' may refer attribute feedback score.

Figure 3K:
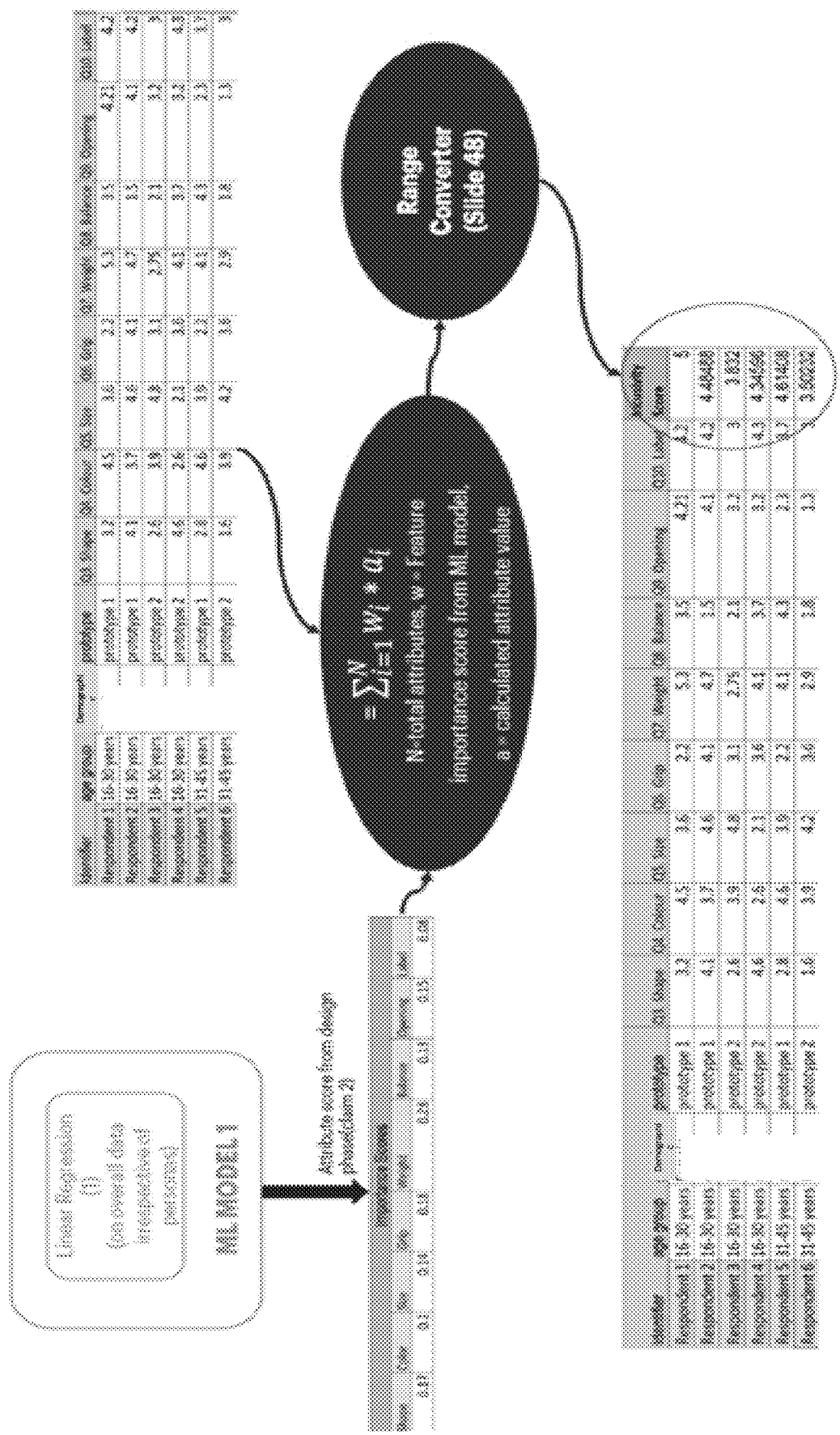
FIG. 3K illustrates a flow diagram for recalculating the overall inclusivity score using weights, according to an example embodiment of the present disclosure.

Further, the processor 102 may combine the feature importance score and the inclusivity score to calculate an overall inclusivity score. For example, in the design phase, the derived feature importance score may be used to combine an attribute level inclusivity score. For overall feedback, the processor 102 considers modified attribute level inclusivity score and combines modified attribute level inclusivity score with feature (i.e., attribute) importance score to calculate overall rating from survey, facial and voice feedback data. FIG. 3K illustrates a flow diagram for recalculating the overall inclusivity score using weights. The ML model 1 may combine attribute level feedback received through survey, to recalculate overall inclusivity score using weights derived from the ML model 1 during the design phase. Further, the processor 102 may calculate the inclusivity score for the product and the at least one user, by combining the haptics feedback with the calculated overall inclusivity score, and the prototype inclusivity score.

Figure 3L:
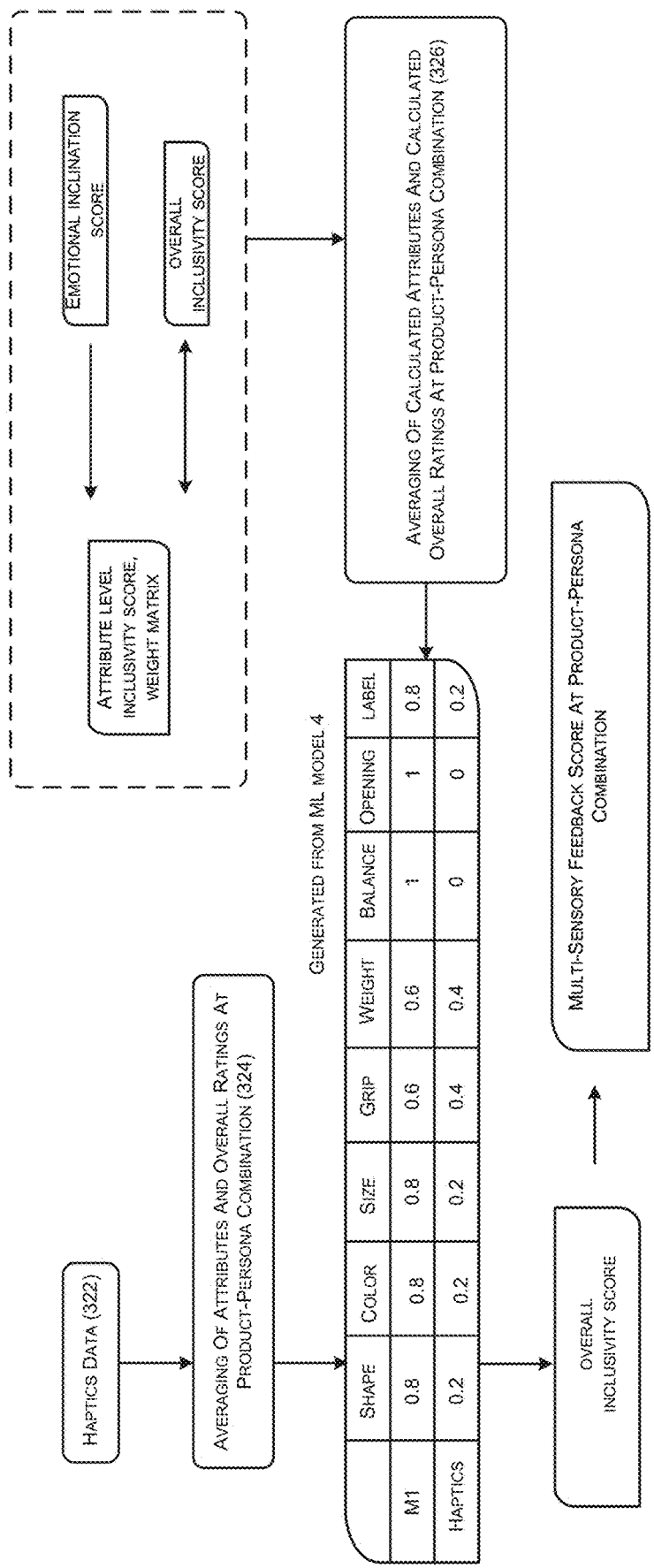
FIG. 3L illustrates a flow diagram for calculating the inclusivity score for product and personas, according to an example embodiment of the present disclosure.

FIG. 3L illustrates a flow diagram for calculating the inclusivity score for product and personas, according to an example embodiment of the present disclosure.

At step 322, the processor 102 captures the haptics data only for selected attributes. At step 324, the processor 102 averages the attributes and overall ratings for a product-persona combination. At step 326, the processor 102 averages the data such as the attribute level inclusivity score, the weight matrix, the emotional inclination score, and the overall inclusivity score at a product-persona level. Because the number of attributes is different, the missing attributes from haptics and other data may be replaced with "0". Further, two new scores may be combined by using a weight matrix (generated from ML model 4), where the weights are distributed considering the relative importance of the type of feedback being captured, and the Σ of the distribution is equal to 1. This combined data is the final feedback score, both at the overall level and at the attribute level.

Figure 3M:
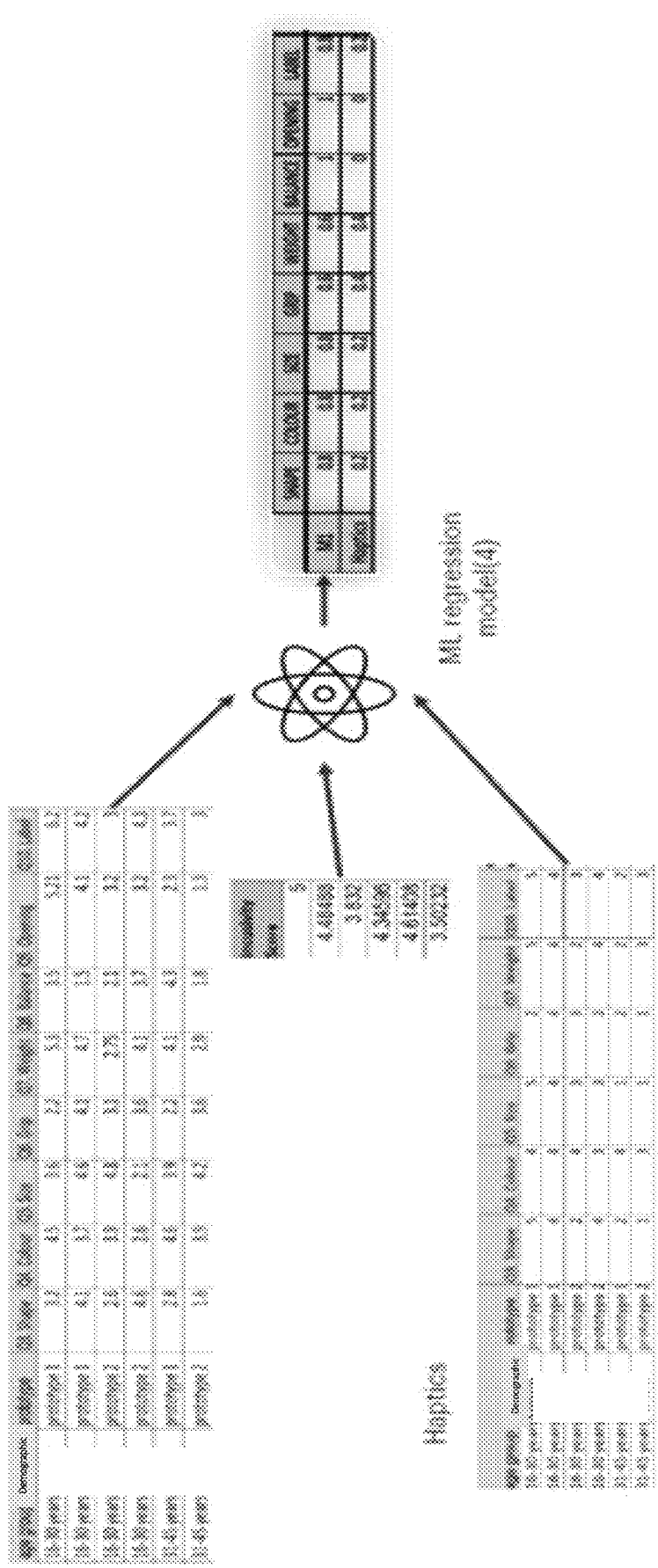
FIG. 3M illustrates a flow diagram for generating matrix at persona level, according to an example embodiment of the present disclosure.
Figure 3N:
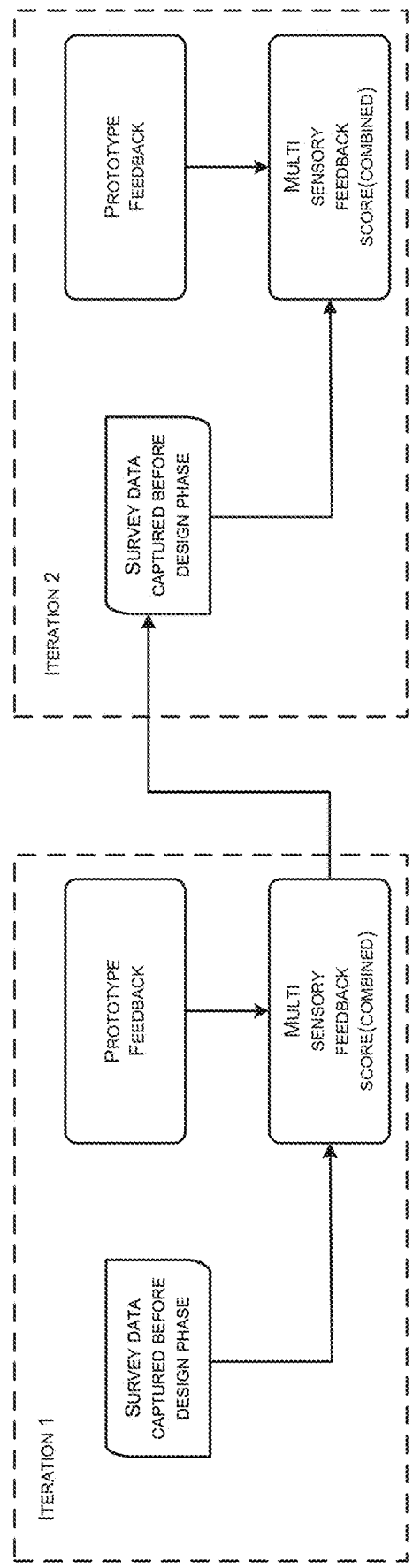
FIG. 3N illustrates a flow diagram for iteratively enriching survey data, according to an example embodiment of the present disclosure.
Figure 30:
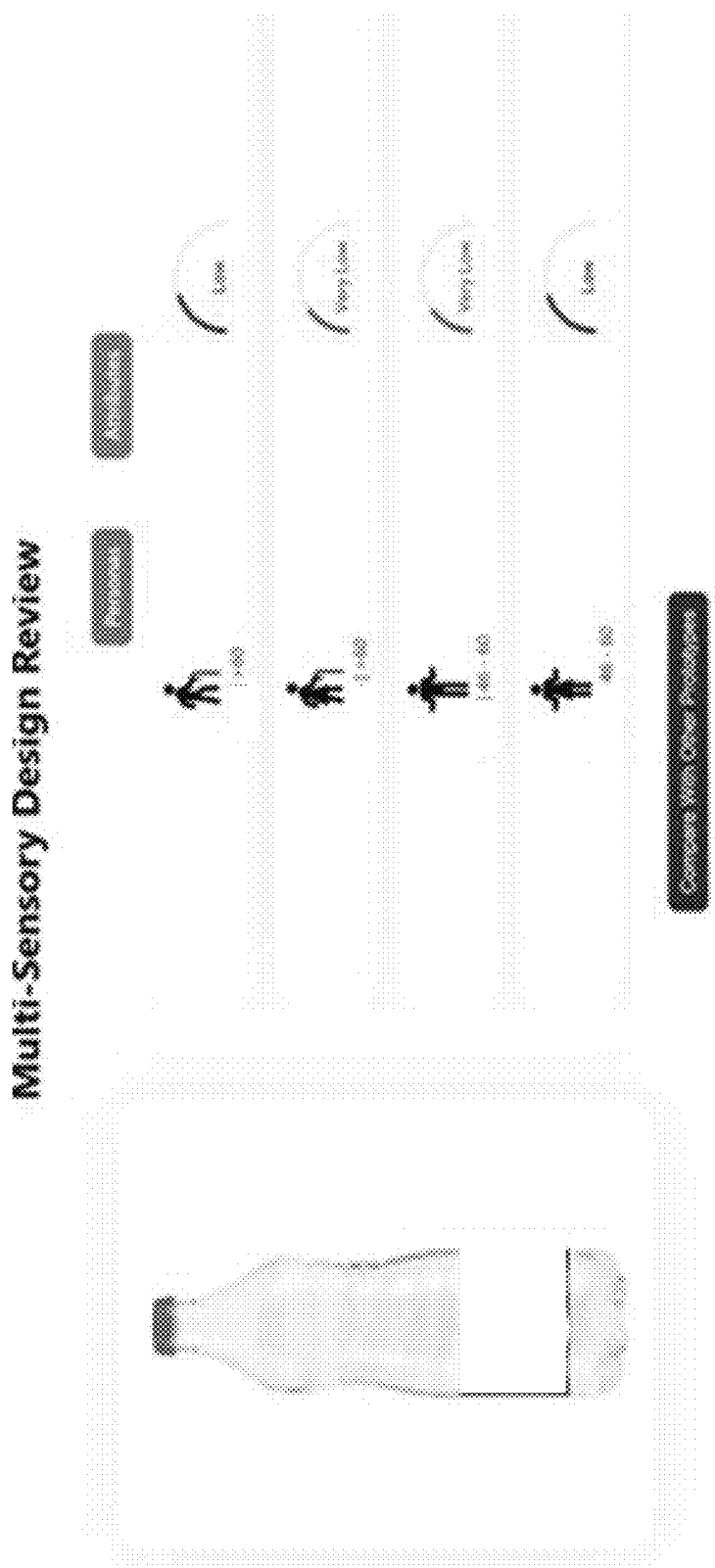
Figure 3P:
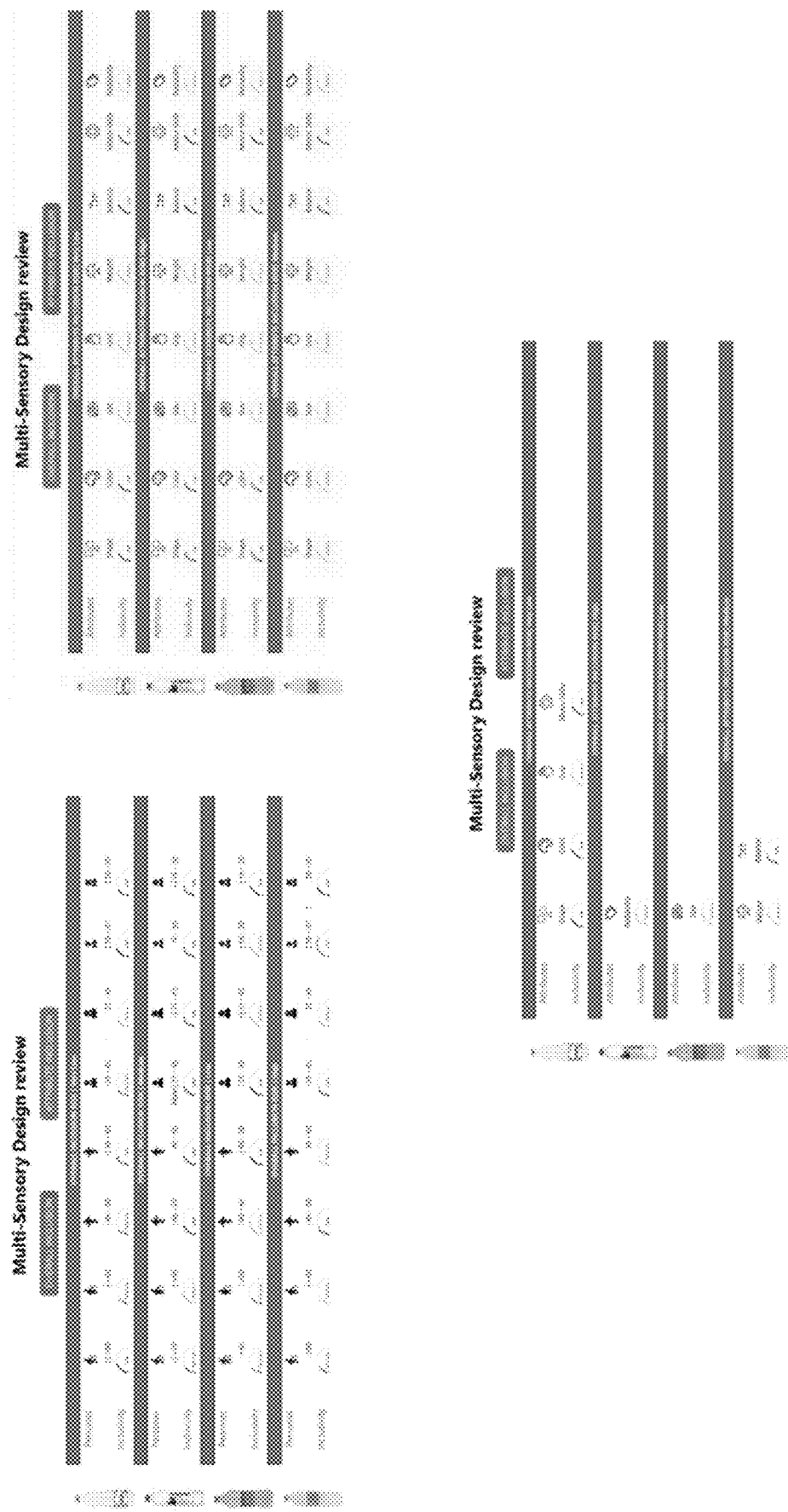

FIG. 3M illustrates a flow diagram for generating matrix at persona level, according to an example embodiment of the present disclosure. Dynamic weights may be generated for each attribute and mechanism combination from the history feedback data. Further, the processor 102 scales the dynamic weights so that sum of weights is "1". FIG. 3N illustrates a flow diagram for iteratively enriching survey data, according to an example embodiment of the present disclosure. The processor 102 may output an iteratively enriched survey data for inclusive designing of products, based on the prototype inclusivity score and the overall score. The output may comprise dashboards and scorecards with a per-user inclusivity score and a per prototype inclusivity score as shown in FIGS. 3O and 3P. For example, the processor 102 via a display device may render comparison of different variant of same type of product (i.e., bottle) as shown in FIGS. 3O and 3P.

The product designer 112 may check the impact of design choice questions such as—"what if I increase importance on the weight?", "what if I increase the importance on color?", "what if I increase the importance on grip?" and the like. FIG. 3P illustrates four different variations of same product (i.e., bottle). The rendering of different variations of same product may provide visualizations of variations and comparisons between different variations. For instance, in the FIG. 3P, the first bottle includes most of the good features such as shape, grip, color, motor skills, and the second bottle has good readability. Similarly, the third bottle has good size, and the fourth bottle has good weight and balance. The product designer 112 may look into all the aspects of inclusivity to at least one user (i.e., 110-1), to provide a prototype design of the bottle. This prototype is displayed to the user 110-1 along with a prototype survey. Further, the user 110-2 may answer or respond to the prototype survey. The prototype survey data from the answered prototype survey may be utilized and appended to the main survey data. For each iteration of the review of the prototype, the augmented survey data may also be appended to the main survey data.

Figure 4:
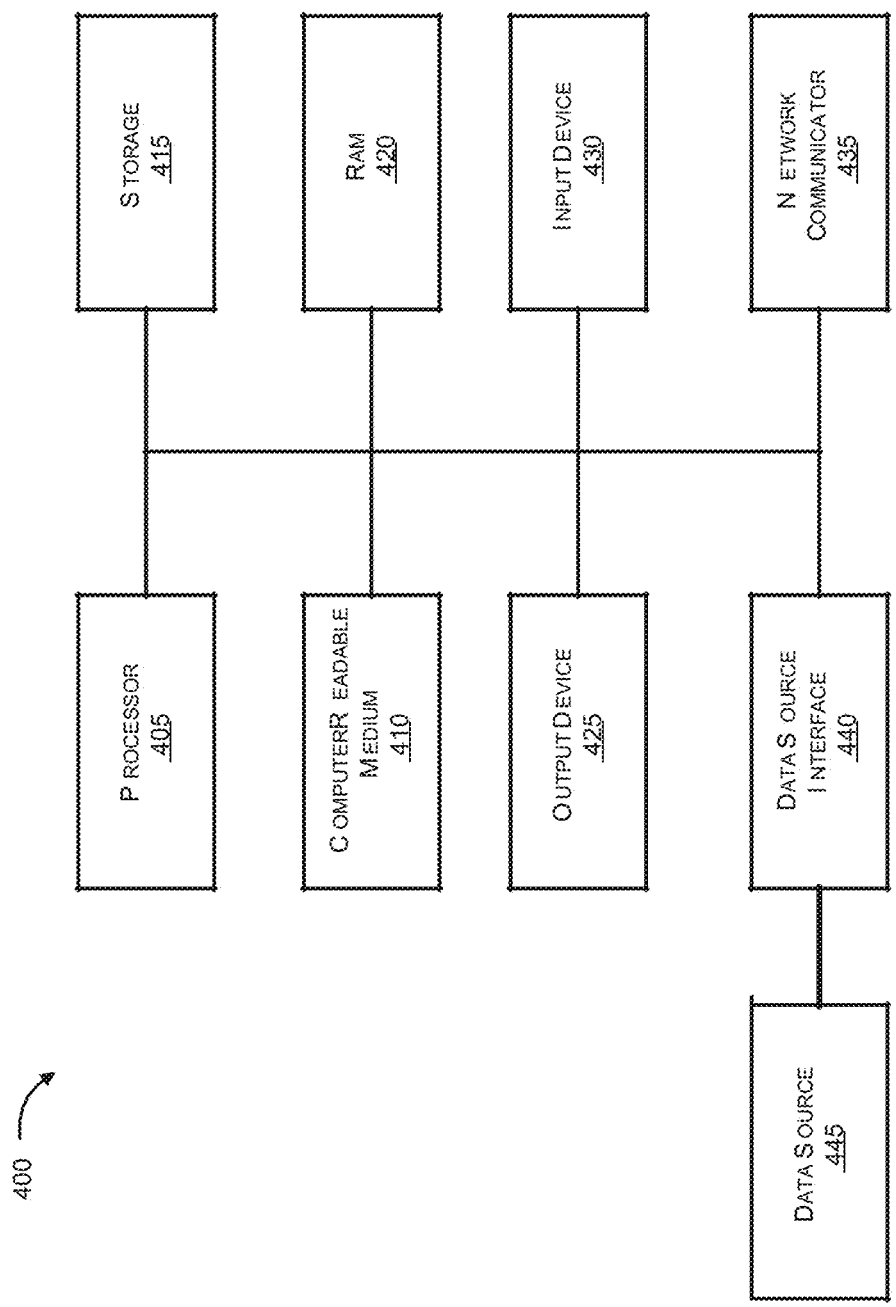
FIG. 4 illustrates a hardware platform for an implementation of the disclosed system, according to an example embodiment of the present disclosure.

FIG. 4 illustrates a hardware platform 400 for implementation of the disclosed system, according to an example embodiment of the present disclosure. For the sake of brevity, the construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 400. As illustrated, the hardware platform 400 may include additional components not shown, and some of the components described may be removed and/or modified. For example, a computer system with multiple GPUs may be located on external-cloud platforms including Amazon Web Services, or internal corporate cloud computing clusters, or organizational computing resources, etc.

The hardware platform 400 may be a computer system such as the system 100 that may be used with the embodiments described herein. The computer system may represent a computational platform that includes components that may be in a server or another computer system. The computer system may execute, by the processor 405 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 405 that executes software instructions or code stored on a non-transitory computer-readable storage medium 410 to perform methods of the present disclosure. The software code includes, for example, instructions to gather data and documents and analyze documents. In an example, the machine learning 104, data engine 106, ML model 106-1, may be software codes or components performing these steps.

The instructions on the computer-readable storage medium 410 are read and stored the instructions in storage 415 or in random access memory (RAM). The storage 415 may provide a space for keeping static data where at least some instructions could be stored for later execution. The stored instructions may be further compiled to generate other representations of the instructions and dynamically stored in the RAM such as RAM 420. The processor 405 may read instructions from the RAM 420 and perform actions as instructed.

The computer system may further include the output device 425 to provide at least some of the results of the execution as output including, but not limited to, visual information to users, such as external agents. The output device 425 may include a display on computing devices and virtual reality glasses. For example, the display may be a mobile phone screen or a laptop screen. GUIs and/or text may be presented as an output on the display screen. The computer system may further include an input device 430 to provide a user or another device with mechanisms for entering data and/or otherwise interact with the computer system. The input device 430 may include, for example, a keyboard, a keypad, a mouse, or a touchscreen. Each of these output devices 425 and input device 430 may be joined by one or more additional peripherals. For example, the output device 425 may be used to display the results such as bot responses by the executable chatbot.

A network communicator 435 may be provided to connect the computer system to a network and in turn to other devices connected to the network including other clients, servers, data stores, and interfaces, for example. A network communicator 435 may include, for example, a network adapter such as a LAN adapter or a wireless adapter. The computer system may include a data sources interface 440 to access the data source 445. The data source 445 may be an information resource. As an example, a database of exceptions and rules may be provided as the data source 445. Moreover, knowledge repositories and curated data may be other examples of the data source 445.

Figure 5:
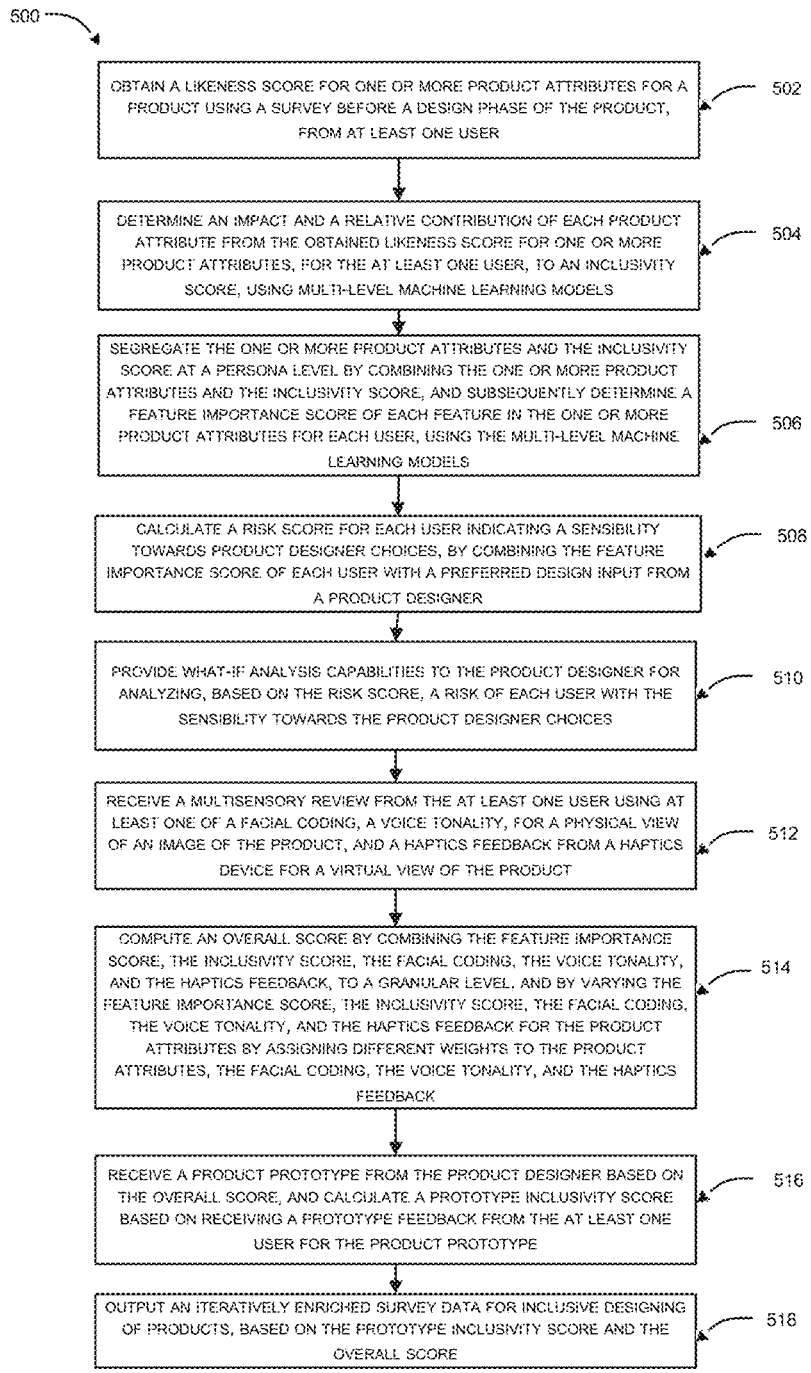
FIG. 5 illustrates a flow diagram depicting a method of inclusive product design, according to an example embodiment of the present disclosure.

FIG. 5 illustrates a flow diagram depicting method 500 of inclusive product design, according to an example embodiment of the present disclosure.

At block 502, the method 500 may include obtaining, by a processor 102 associated with a system 100, a likeness score for one or more product attributes for a product using a survey before a design phase of the product, from at least one user.

At block 504, the method 500 may include determining, by the processor 102, an impact and a relative contribution of each product attribute from the obtained likeness score for one or more product attributes, for the at least one user, to an inclusivity score, using multi-level machine learning models.

At block 506, the method 500 may include segregating, by the processor 102, the product attributes and the inclusivity score at a persona level by combining the one or more product attributes and the inclusivity score, and subsequently determining a feature importance score of each feature in the product attributes for each user, using multi-level machine learning models. The one or more product attributes include information that belongs to one or more product features. Further, the importance of each feature may be obtained through any specific attribute using one or more coefficients of the attributes. The larger the coefficient value (both in the positive and negative direction), the greater the effect of the corresponding feature on the inclusive product design.

At block 508, the method 500 may include calculating, by the processor 102, a risk score for each user indicating a sensibility towards product designer choices, by combining the feature importance score of each user, with a preferred design input from a product designer.

At block 510, the method 500 may include providing, by the processor 102, what-if analysis capabilities to the product designer, for analyzing, based on the risk score, a risk of each user with the sensibility towards the product designer choices, wherein the risk score is converted into at least one category for providing the what-if analysis capabilities.

At block 512, the method 500 may include receiving, by the processor 102, a multisensory review from the at least one user using at least one of a facial coding, a voice tonality, for a physical view of an image of the product, and a haptics feedback from a haptics device for a virtual view of the product.

At block 514, the method 500 may include computing, by the processor 102, an overall score by combining the feature importance score, the inclusivity score, the facial coding, the voice tonality, and the haptics feedback, to a granular level. Further, the method 500 may include computing, by the processor 102, the overall score, by varying the feature importance score, the inclusivity score, the facial coding, the voice tonality, and the haptics feedback for the product attributes. Further, the method 500 may include computing, by the processor 102, the overall score, by assigning of different weights to the product attributes, the facial coding, the voice tonality, and the haptics feedback.

At block 516, the method 500 may include receiving, by the processor 102, a product prototype from the product designer based on the overall score, and calculating a prototype inclusivity score based on receiving a prototype feedback from the at least one user for the product prototype.

At block 518, the method 500 may include outputting, by the processor 102, an iteratively enriched survey data for inclusive designing of products, based on the prototype inclusivity score and the overall score.

The order in which the method 500 is described is not intended to be construed as a limitation, and any number of the described method blocks may be combined or otherwise performed in any order to implement the method 500 or an alternate method. Additionally, individual blocks may be deleted from the method 500 without departing from the spirit and scope of the present disclosure described herein. Furthermore, the method 500 may be implemented in any suitable hardware, software, firmware, or a combination thereof, that exists in the related art or that is later developed. The method 500 describes, without limitation, the implementation of the system 100. A person of skill in the art will understand that method 500 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor,
   a memory coupled to the processor, wherein the memory comprises processor-executable instructions, which on execution, causes the processor to:
   obtain a likeness score for one or more product attributes for a product using a survey data before a design phase of the product, from at least one user;
   determine an impact and a relative contribution of each product attribute from the obtained likeness score for one or more product attributes, for the at least one user, to an inclusivity score, using multi-level machine learning models;

segregate the one or more product attributes and the inclusivity score at a persona level by combining the one or more product attributes and the inclusivity score, and subsequently determine a feature importance score of each feature in the one or more product attributes for each user, using the multi-level machine learning models, wherein the one or more product attributes comprises information corresponding to one or more features;

pre-process the survey data using at least one of handling missing values, performing univariate/bivariate analysis, skewness analysis, and feature creation;

split the pre-processed survey data into training and testing data for each persona of one or more personas;

perform linear regression on the overall training and testing data irrespective of a number of personas using a first machine learning (ML) model level to obtain linear regression data;

split the linear regression data to perform linear regression for each persona using a second ML model level;

feed to an individual decision tree for each persona by splitting the linear regression data using a third ML model level;

obtain, an error from each model, and determining weight of each model for each product attribute;

determine the feature importance score for each attribute based on the determined weights;

calculate a risk score for each user indicating a sensibility towards product designer choices, by combining the feature importance score of each user with a preferred design input from a product designer;

provide what-if analysis capabilities to the product designer for analyzing, based on the risk score, a risk of each user with the sensibility towards the product designer choices, wherein the risk score is converted into at least one category for providing the what-if analysis capabilities;

capture a haptic feedback by a haptics device to determine a force on the product;

capture, using a camera, a facial coding;

determine, using voice analytics by the camera, a voice tonality of the user;

receive a multisensory review from the at least one user using the facial coding, the voice tonality, for a physical view of an image of the product, and the haptics feedback from the haptics device for a virtual view of the product;

compute an overall score by combining the feature importance score, the inclusivity score, the facial coding, the voice tonality, and the haptics feedback, to a granular level, and by varying the feature importance score, the inclusivity score, the facial coding, the voice tonality, and the haptics feedback for the product attributes by assigning different weights to the product attributes, the facial coding, the voice tonality, and the haptics feedback;

receive a product prototype from the product designer based on the overall score, and calculate a prototype inclusivity score based on receiving a prototype feedback from the at least one user for the product prototype; and output an iteratively enriched survey data for inclusive designing of products, based on the prototype inclusivity score and the overall score, using a dashboard comprising visualizations of variations of the product and comparisons between different variations.

2. The system as claimed in claim 1, wherein the one or more product attributes are pre-processed based on handling missing values, performing univariate and bivariate analysis, skewness analysis, and feature creation.

3. The system as claimed in claim 1, wherein the product attributes comprise at least one of a shape, a size, a color, a grip, a weight, a balance, motor skills, and a readability across multiple inclusion dimensions, and wherein the inclusion dimensions comprise demographic data.

4. The system as claimed in claim 1, wherein the feature importance score is determined based on scaling a product attribute importance score from the multi-level machine learning models, into a range.

5. The system as claimed in claim 1, wherein the feature importance score is determined based on linear regression on the product attributes, the segregated product attributes, the inclusivity score, and a decision tree for each of the product attribute for each user.

6. The system as claimed in claim 1, wherein converting the risk score into at least one category is based on a pre-defined threshold for each category.

7. The system as claimed in claim 1, wherein, for computing the overall score, the processor is configured to:
calculate an emotional inclination for the facial coding and voice tonality and scale the emotional inclination to a same level as that of the feature importance score;
combine scaled emotional inclination with the prototype feedback at a product attribute level using a data-driven smart weight matrix;
combine the feature importance score and the inclusivity score to calculate an overall inclusivity score; and
calculate the inclusivity score for the product and the at least one user, by combining the haptics feedback with the calculated overall inclusivity score, and the prototype inclusivity score.

8. The system as claimed in claim 7, wherein the weight matrix captures a relevance of each feedback/input for each product attribute.

9. The system as claimed in claim 1, wherein the output comprises dashboards and scorecards with a per-user inclusivity score and a per prototype inclusivity score.

10. A method comprising:
obtaining, by a processor associated with a system, a likeness score for one or more product attributes for a product using a survey data before a design phase of the product, from at least one user;
determining, by the processor, an impact and a relative contribution of each product attribute from the obtained likeness score for one or more product attributes, for the at least one user, to an inclusivity score, using multi-level machine learning models;
segregating, by the processor, the product attributes and the inclusivity score at a persona level by combining the one or more product attributes and the inclusivity score, and subsequently determining a feature importance score of each feature in the product attributes for each user, using multi-level machine learning models, wherein the one or more product attributes comprise information corresponding to one or more features;
pre-processing the survey data using at least one of: handling missing values, performing univariate/bivariate analysis, skewness analysis, and feature creation;

splitting the pre-processed survey data into training and testing data for each persona of one or more personas;

performing linear regression on the overall training and testing data irrespective of a number of personas, using a first machine learning (ML) model level to obtain linear regression data;

splitting the linear regression data to perform linear regression for each persona using a second ML model level;

feeding to an individual decision tree for each persona by splitting the linear regression data using a third ML model level;

obtaining, an error from each model, and determining weight of each model for each product attribute;

determining the feature importance score for each attribute based on the determined weights;

calculating, by the processor, a risk score for each user indicating a sensibility towards product designer choices, by combining the feature importance score of each user, with a preferred design input from a product designer;

providing, by the processor, what-if analysis capabilities to the product designer, for analyzing, based on the risk score, a risk of each user with the sensibility towards the product designer choices, wherein the risk score is converted into at least one category for providing the what-if analysis capabilities;

capturing a haptic feedback by a haptics device to determine a force on the product;

capturing, using a camera, a facial coding;

determining, using voice analytics by the camera, a voice tonality of the user;

receiving, by the processor, a multisensory review from the at least one user using the facial coding, the voice tonality, for a physical view of an image of the product, and the haptics feedback from the haptics device for a virtual view of the product;

computing, by the processor, an overall score by combining the feature importance score, the inclusivity score, the facial coding, the voice tonality, and the haptics feedback, to a granular level, and by varying the feature importance score, the inclusivity score, the facial coding, the voice tonality, and the haptics feedback for the product attributes, by assigning of different weights to the product attributes, the facial coding, the voice tonality, and the haptics feedback;

receiving, by the processor, a product prototype from the product designer based on the overall score, and calculating a prototype inclusivity score based on receiving a prototype feedback from the at least one user for the product prototype; and outputting, by the processor, an iteratively enriched survey data for inclusive designing of products, based on the prototype inclusivity score and the overall score, using a dashboard comprising visualizations of variations of the product and comparisons between different variations.

11. The method as claimed in claim 10, wherein the one or more product attributes are pre-processed based on handling missing values, performing univariate and bivariate analysis, skewness analysis, and feature creation.

12. The method as claimed in claim 10, wherein the product attributes comprise at least one of a shape, a size, a color, a grip, a weight, a balance, motor skills, and a readability across multiple inclusion dimensions, and wherein the inclusion dimensions comprise demographic data.

13. The method as claimed in claim 10, wherein the feature importance score is determined based on scaling a product attribute importance score from the multi-level machine learning models, into a range, and wherein the feature importance score is determined based on linear regression on the product attributes, the segregated product attributes, the inclusivity score, and a decision tree for each of the product attribute for each user.

14. The method as claimed in claim 10, wherein converting the risk score into at least one category is based on a pre-defined threshold for each category.

15. The method as claimed in claim 10, wherein computing the overall score further comprises:

calculating, by the processor, an emotional inclination for the facial coding and voice tonality and scaling the emotional inclination to a same level as that of the feature importance score;

combining, by the processor, scaled emotional inclination with the prototype feedback at a product attribute level using a data-driven smart weight matrix;

combining, by the processor, the feature importance score and the inclusivity score to calculate an overall inclusivity score; and calculating, by the processor, the inclusivity score for the product and at least one user, by combining the haptics feedback with the calculated overall inclusivity score, and the prototype inclusivity score.

16. The method as claimed in claim 15, wherein the weight matrix captures a relevance of each feedback/input for each product attribute.

17. The method as claimed in claim 10, wherein the output comprises dashboards and scorecards with a per-user inclusivity score and a per prototype wise score.

18. A non-transitory computer-readable medium comprising machine-executable instructions, which are executable by a processor to:

obtain a likeness score for one or more product attributes for a product using a survey data before a design phase of the product, from at least one user;

determine an impact and a relative contribution of each product attribute from the obtained likeness score for one or more product attributes, for the at least one user, to an inclusivity score, using multi-level machine learning models;

segregate the one or more product attributes and the inclusivity score at a persona level by combining the one or more product attributes and the inclusivity score, and subsequently determine a feature importance score of each feature in the one or more product attributes for each user, using the multi-level machine learning models, wherein the one or more product attributes comprises information corresponding to one or more features;

pre-process the survey data using at least one of handling missing values, performing univariate/bivariate analysis, skewness analysis, and feature creation;

split the pre-processed survey data into training and testing data for each persona of one or more personas;

perform linear regression on the overall training and testing data irrespective of a number of personas, using a first machine learning (ML) model level to obtain linear regression data;

split the linear regression data to perform linear regression for each persona using a second ML model level;

feed to an individual decision tree for each persona by splitting the linear regression data using a third ML model level;

obtain, an error from each model, and determining weight of each model for each product attribute;

determine the feature importance score for each attribute based on the determined weights;

calculate a risk score for each user indicating a sensibility towards product designer choices, by combining the feature importance score of each user with a preferred design input from a product designer;

provide what-if analysis capabilities to the product designer for analyzing, based on the risk score, a risk of each user with the sensibility towards the product designer choices, wherein the risk score is converted into at least one category for providing the what-if analysis capabilities;

capture a haptic feedback by a haptics device to determine a force on the product;

capture, using a camera, a facial coding;

determine, using voice analytics by the camera, a voice tonality of the user;

receive a multisensory review from the at least one user using the facial coding, the voice tonality, for a physical view of an image of the product, and the haptics feedback from the haptics device for a virtual view of the product;

compute an overall score by combining the feature importance score, the inclusivity score, the facial coding, the voice tonality, and the haptics feedback, to a granular level, and by varying the feature importance score, the inclusivity score, the facial coding, the voice tonality, and the haptics feedback for the product attributes by assigning different weights to the product attributes, the facial coding, the voice tonality, and the haptics feedback;

receive a product prototype from the product designer based on the overall score, and calculate a prototype inclusivity score based on receiving a prototype feedback from the at least one user for the product prototype; and output an iteratively enriched survey data for inclusive designing of products, based on the prototype inclusivity score and the overall score, using a dashboard comprising visualizations of variations of the product and comparisons between different variations.

* * * * *